US012723113B2

(12) United States Patent
Lederhose et al.

(10) Patent No.: US 12,723,113 B2
(45) Date of Patent: Sep. 1, 2026

(54) PROCESS FOR PREPARING HIGH-REACTIVITY ISOBUTENE HOMO- OR COPOLYMERS

(71) Applicant: BASF SE, Ludwigshafen am Rhein (DE)

(72) Inventors: Paul Lederhose, Ludwigshafen (DE); Klaus Muehlbach, Gruenstadt (DE); Sergei V. Kostjuk, Minsk (BY); Irina V. Vasilenko, Minsk (BY); Ivan A. Berezianko, Minsk (BY)

(73) Assignee: BASF SE, Ludwigshafen am Rhein (DE)

( * ) Notice: Subject to any disclaimer, the term of this patent is extended or adjusted under 35 U.S.C. 154(b) by 828 days.

(21) Appl. No.: 18/040,331

(22) PCT Filed: Jul. 27, 2021

(86) PCT No.: PCT/EP2021/070987
§ 371 (c)(1),
(2) Date: Feb. 2, 2023

(87) PCT Pub. No.: WO2022/028951
PCT Pub. Date: Feb. 10, 2022

(65) Prior Publication Data

US 2023/0365726 A1 Nov. 16, 2023

(30) Foreign Application Priority Data

Aug. 5, 2020 (EP) .................................... 20189546
Sep. 10, 2020 (EP) .................................... 20195544

(51) Int. Cl.
*C08F 4/14* (2006.01)
*C08F 2/02* (2006.01)
(Continued)

(52) U.S. Cl.
CPC ................ *C08F 10/10* (2013.01); *C08F 2/02* (2013.01); *C08F 2/04* (2013.01); *C08F 4/14* (2013.01);
(Continued)

(58) Field of Classification Search
None
See application file for complete search history.

(56) References Cited

U.S. PATENT DOCUMENTS 3,660,350 A 5/1972 Kushlefsky
4,028,481 A 6/1977 Shiomura et al.
(Continued)

FOREIGN PATENT DOCUMENTS

CN 102399308 A 4/2012
CN 102399311 A 4/2012
(Continued)

OTHER PUBLICATIONS

Anonymous, et al., "Vinyl and Diene Monomers", vol. 24, Part 2, ed. Edward C. Leonard, J. Wiley & Sons publishers, 1971, pp. 713-733.

(Continued)

*Primary Examiner* — Richard A. Huhn
(74) *Attorney, Agent, or Firm* — Grüneberg Global IP, PLLC

(57) ABSTRACT

A novel process can be used for preparing high-reactivity isobutene homo- or copolymers, by polymerizing isobutene or an isobutene-containing monomer mixture in the presence of a polymerization catalyst.

15 Claims, 3 Drawing Sheets

(51) Int. Cl.

| | |
|---|---|
| ***C08F 2/04*** | (2006.01) |
| ***C08F 4/26*** | (2006.01) |
| ***C08F 4/52*** | (2006.01) |
| ***C08F 4/609*** | (2006.01) |
| ***C08F 10/10*** | (2006.01) |

(52) U.S. Cl.

CPC .................. *C08F 4/26* (2013.01); *C08F 4/52* (2013.01); *C08F 4/6097* (2013.01)

(56) References Cited

U.S. PATENT DOCUMENTS

| | | | |
|---|---|---|---|
| 4,152,499 A | 5/1979 | Boerzel et al. | |
| 4,507,449 A | 3/1985 | Martin | |
| 5,248,746 A * | 9/1993 | Shimokawa .......... | C08F 297/00 526/216 |
| 8,937,138 B2 | 1/2015 | Wu et al. | |
| 10,059,786 B2 | 8/2018 | Kim et al. | |
| 10,968,294 B2 * | 4/2021 | Corberan Roc ........ | C08F 10/10 |
| 10,975,180 B2 | 4/2021 | Corberan Roc et al. | |

FOREIGN PATENT DOCUMENTS

| | | |
|---|---|---|
| DE | 2702604 A1 | 7/1978 |
| JP | 2013-506013 A | 2/2013 |
| JP | 2016-519197 A | 6/2016 |
| JP | 2019-509374 A | 4/2019 |
| WO | WO-2018/015306 A1 | 1/2018 |

OTHER PUBLICATIONS

Berezianko, et al., "Acidic imidazole-based ionic liquids in the presence of diisopropyl ether as catalysts for the synthesis of highly reactive polyisobutylene: effect of ionic liquid nature, catalyst aging, and sonication", Polymer, vol. 145, Jun. 6, 2018, pp. 382-390.

Coleman, et al., "Liquid coordination complexes formed by the heterolytic cleavage of metal halides", Angewandte Chemie International Edition, vol. 52, Issue 48, Oct. 11, 2013, pp. 12582-12586.

European Search Report for EP Patent Application No. 20189546.3, Issued on Jan. 20, 2021, 4 pages.

Gurnani, et al., "Tin(ii) fluoridevs.tin(ii) chloride—a comparison of their coordination chemistry with neutral ligands", Dalton Transactions, vol. 42, Issue 23, Apr. 15, 2013, pp. 8364-8374.

Hogg, et al., "Liquid coordination complexes of Lewis acidic metal chlorides: Lewis acidity and insights into speciation", Dalton Transactions, vol. 46, Issue 35, Jul. 21, 2017, pp. 11561-11574.

International Search Report for PCT Patent Application No. PCT/EP2021/070987, Issued on Nov. 8, 2021, 4 pages.

Kennedy, et al., "Living Carbocationic Polymerization. XXXIX. Isobutylene Polymerization in the Presence of Pyridine and Various Other Electron Donors", Journal of Macromolecular Science: Part A—Chemistry, vol. 28, Issue 2, Oct. 2006, pp. 197-207.

Kostjuk, et al., "Novel initiating system based on AlCl3 etherate for quasiliving cationic polymerization of styrene", Polymer Bulletin, vol. 52, Oct. 2004, pp. 227-234.

Shiman, et al., "Cationic polymerization of isobutylene by complexes of alkylaluminum dichlorides with diisopropyl ether: An activating effect of water", Journal of Polymer Science Part A: Polymer Chemistry, vol. 52, Issue 16, May 30, 2014, pp. 2386-2393.

Vasilenko, et al., "Cationic Polymerization of Isobutylene Using AlCl3OBu2 as a Coinitiator: Synthesis of Highly Reactive Polyisobutylene", Macromolecules, vol. 43, Issue 13, Jun. 9, 2010, pp. 5503-5507.

Vasilenko, et al., "New catalysts for the synthesis of highly reactive polyisobutylene: Chloroaluminate imidazole-based ionic liquids in the presence of diisopropyl ether", Polymer Chemistry, vol. 7, Issue 36, Aug. 18, 2016, pp. 5615-5619.

Welch, et al., "Preparation and polymerization of addition compounds of unsaturated tertiary phosphine oxides", Journal of Polymer Science Part A: General Papers, vol. 3, Issue 10, Oct. 1965, pp. 3427-3437.

International Preliminary Report on Patentability for PCT Patent Application No. PCT/EP2021/070987, Issued on Feb. 16, 2023, 10 pages.

Written Opinion for PCT Patent Application No. PCT/EP2021/070987, Issued on Nov. 8, 2021, 8 pages.

Liu, et al., "A cost-effective process for highly reactive polyisobutylenes via cationic polymerization coinitiated by AlCl3", Polymer, vol. 51, Issue 25, Nov. 26, 2010, pp. 5960-5969.

Lou, et al., "Introduction to Polymer Science", 2nd Edition, Harbin Institute of Technology Press, Jan. 2019, p. 15, 9 pages.

Pan, et al., "University Trial Textbook-Polymer Chemistry", Chemical Industry Press, Jul. 1980, p. 145, 4 pages.

Yu, et al., "Polymer Chemistry", Second Edition, China Textile Press, Jul. 1999, p. 98, 8 pages.

* cited by examiner

PROCESS FOR PREPARING HIGH-REACTIVITY ISOBUTENE HOMO- OR COPOLYMERS

CROSS-REFERENCE TO RELATED APPLICATIONS

This application is a National Stage entry under § 371 of International Application No. PCT/EP2021/070987, filed on Jul. 27, 2021, and which claims the benefit of priority to European Application No. 20189546.3, filed on Aug. 5, 2020, and priority to European Application No. 20195544.0, filed on Sep. 10, 2020. The content of each of these applications is hereby incorporated by reference in its entirety.

BACKGROUND OF THE INVENTION

Field of the Invention

The present invention relates to a novel process for preparing high-reactivity isobutene homo- or copolymers with a content of terminal vinylidene double bonds per polyisobutene chain end of at least 70 mol %. The present invention further relates to novel isobutene polymers.

Description of Related Art

In contrast to so-called low-reactivity polymers, high-reactivity isobutene homo- or copolymers are understood to mean those polyisobutenes which comprise a high content of terminal ethylenic double bonds (α-double bonds) and other reactive double bonds, such as β-double bonds, susceptible to subsequent reactions, such as Alder-Ene-reaction with maleic acid anhydride, specifically in practice usually of at least 60, preferably at least 70 and very preferably at least 75 mol %, based on the individual chain ends of the polyisobutene macromolecules. In the context of the present application, vinylidene groups are understood to mean those terminal ethylenic double bonds whose position in the polyisobutene macromolecule is described by the general formula

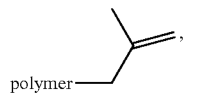

i.e. the double bond is present in an a position in the polymer chain. "Polymer" represents the polyisobutene radical shortened by one isobutene unit. The vinylidene groups exhibit the highest reactivity in many types of reactions, for example in the thermal addition onto sterically demanding reactants such as maleic anhydride, whereas a double bond further toward the interior of the macromolecules in most cases exhibits lower reactivity, if any, in functionalization reactions. The uses of high-reactivity polyisobutenes include use as intermediates for preparing additives for lubricants and fuels, as described, for example, in DE-A 27 02 604.

It has additionally been known for some time that the Lewis acid aluminum trichloride can also be used as a polymerization catalyst for isobutene, for example from High Polymers, volume XXIV (part 2), p. 713-733 (editor: Edward C. Leonard), J. Wiley & Sons publishers, New York, 1971.

In the literature article "Novel initiating system based on $AlCl_3$ etherate for quasiliving cationic polymerization of styrene" in Polymer Bulletin Vol. 52, p. 227-234 (2004), Sergei V. Kostjuk et al. describe a catalyst system composed of 2-phenyl-2-propanol and an aluminum trichloride/dinbutyl ether complex for polymerization of styrene. Polymerization of isobutene with a complex of $AlCl_3$ and dibutylether to highly reactive polyisobutene was described in Sergei V. Kostjuk et al., Macromolecules 2010, 43, 5503-5507.

Dmitriy I. Shiman, Irina V. Vasilenko, Sergei V. Kostjuk, Journal of Polymer Science, Part A: Polymer Chemistry 2014, 52, 2386-2393 disclose the preparation of polyisobutene polymers by polymerizing isobutene in the presence of an alkylaluminum halogenide an ether complex as a polymerization catalyst.

WO 18/015306 discloses a process for preparing high-reactivity isobutene homo- or copolymers in which certain Lewis Acids are used together with at least one donor and at least one ionic liquid.

Examples for such ionic liquids disclosed in WO 18/015306 are inter al/a phosphor-containing compounds in which the cation is a permanent quaternary phosphonium salt.

It is, however, a disadvantage of such ionic liquids that they are expensive to prepare and dramatically attenuate the reactivity of the Lewis Acid used.

In Kostjuk et al., Polym. Chem., 2016, 7, 5615-5619 and Polymer, 145 (2018) 382-390 it is further pointed out that ionic liquids as catalyst for isobutene polymerization require quite long reaction time in order to achieve medium to high conversion of the monomers. FIG. 2 shows a diagram taken from the latter document in which conversion of isobutene and exo-selectivity of the reaction in the presence of [emim]Cl—$AlCl_3$ (1), [emim]Cl—$FeCl_3$ (2), and [emim]Cl—$GaCl_3$ (3) are shown vs the reaction time.

CN 102399308 A (machine translation) discloses a cationic polymerization in emulsion of isobutene as monomer using aluminium trichloride and triphenyl phosphinoxide as catalyst. Sorbitol monooleate is used as an emulsifier in the polymerization mixture.

No information on double bond content is given, only polyisobutene with a high molecular weight of 240,000 is obtained.

SUMMARY OF THE INVENTION

It was an object of the present invention to provide a process for preparing high-reactivity isobutene homo- or copolymers with an increased content of terminal vinylidene double bonds (α-double bonds) as well as β-double bonds per polyisobutene chain end of at least 60 mol % in acceptable yields and high reaction rates. The catalyst system should at the same time have sufficient activity and service life, the preparation thereof should be easy. It was further an object of the present invention to develop a catalyst system which leads to high conversion and keeps the selectivity of the reactive double bonds, especially the α-double bonds even at high conversion.

The object was achieved by a process for preparing high-reactivity isobutene homo- or copolymers with a content of α-double bonds and β-double bonds (in sum) per polyisobutene chain end of at least 60, preferably at least 70 and very preferably at least 75 mol %, which comprises polymerizing isobutene or an isobutene-comprising monomer mixture in the presence of at least one Lewis Acid effective as a polymerization catalyst, selected from the group consisting of an aluminum trihalide-donor complex, an alkylaluminum halide-donor complex, an iron trihalide-donor complex, a gallium trihalide-donor complex, a titanium tetrahalide-donor complex, a zinc dihalide-donor complex, a tin dihalide-donor complex, a tin tetrahalide-donor complex, and a boron trihalide-donor complex, said complex comprising, as the donor, a mixture of at least one organic compound (II) comprising at least one oxygen or nitrogen atom with at least one lone electron pair, preferably comprising at least one oxygen atom with at least one lone electron pair, very preferably selected from the group consisting of organic compounds with at least one ether function, organic compounds with at least one carboxylic ester function, organic compounds with at least one aldehyde function, organic compounds with at least one keto function, and organic compounds with at least one nitrogen containing heterocyclic ring, and at least one phosphorus-containing compound of formula (I)

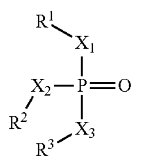

or formula (Ia)

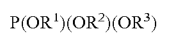

or formula (Ib)

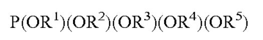

in which $X_1$, $X_2$, and $X_3$ independently of another are oxygen, sulphur or a single bond, preferably oxygen or a single bond, and very preferably a single bond, and $R^1$, $R^2$, $R^3$, $R^4$, and $R^5$ independently of another are an organic residue with up to 20 carbon atoms, with the proviso that the complex formed from the at least one Lewis Acid and the at least one phosphorus-containing compound of formula (I) or (Ia) or (Ib) has a melting point of not more than 60° C., preferably not more than 40° C., and especially not more than 20° C.

$R^1$, $R^2$, $R^3$, $R^4$, and $R^5$ are each, independently of one another, $C_1$-$C_{20}$-alkyl, $C_2$-$C_{20}$-alkyl interrupted by one or more oxygen and/or sulphur atoms and/or one or more substituted or unsubstituted imino groups, $C_6$-$C_{12}$-aryl, $C_5$-$C_{12}$-cycloalkyl or a five- or six-membered, oxygen-, nitrogen- and/or sulphur-containing heterocycle or two of them together form an unsaturated, saturated or aromatic ring which may be interrupted by one or more oxygen and/or sulphur atoms and/or one or more substituted or unsubstituted imino groups, where the radicals mentioned may each be substituted by functional groups, aryl, alkyl, aryloxy, alkyloxy, halogen, heteroatoms and/or heterocycles Since the complex formed from the at least one Lewis Acid and the at least one phosphorus-containing compound of formula (I) or (Ia) or (Ib) is liquid under these conditions it is also referred to as "Liquid Coordination Complex" or "LCC".

DETAILED DESCRIPTION OF THE INVENTION

Figure 1:
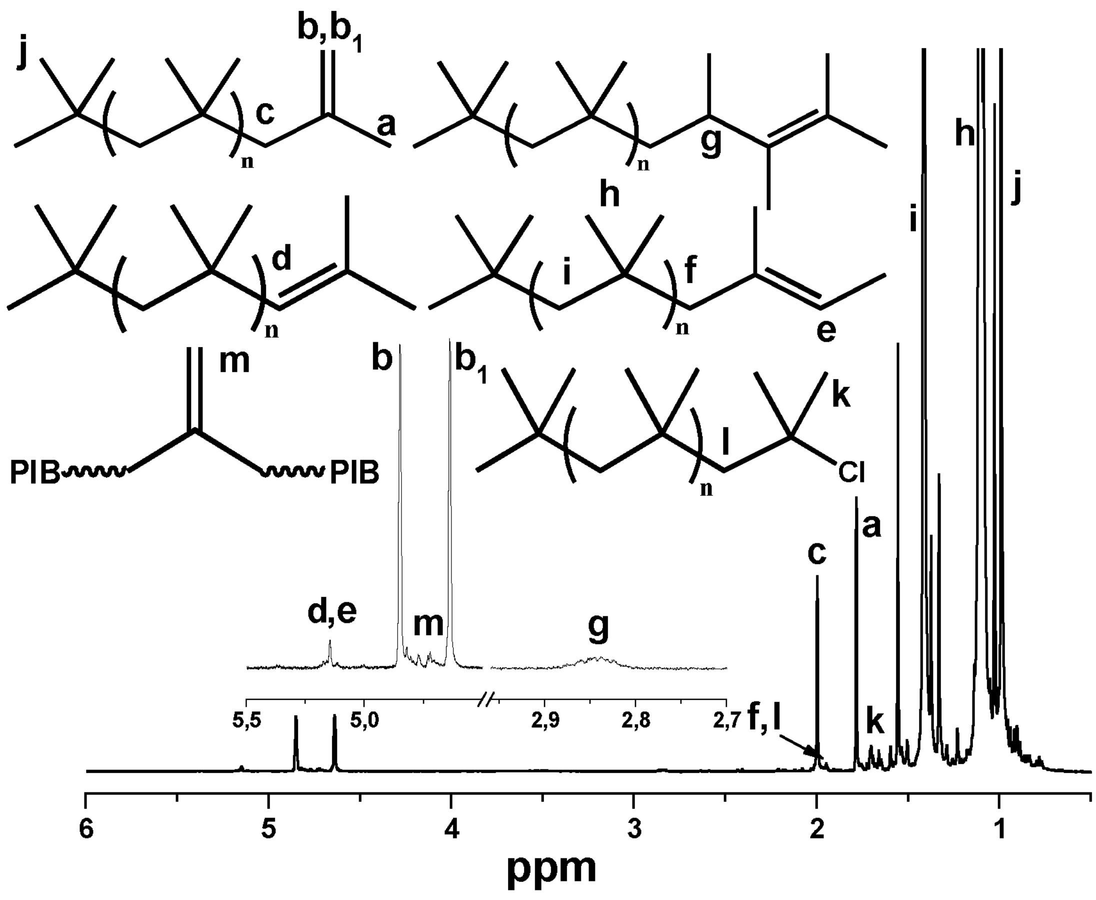
FIG. 1 shows a $^1$H NMR spectrum depicting PIB end groups content by $^1$H NMR spectroscopy.

J. M. Hogg, L. C. Brown, K. Matuszek, P. Latos, A. Chrobok and M. Swadźba-Kwaśny, Dalton Transaction, 2017, 46, 11561 report the successful synthesis and liquid state at the room temperature for complexes formed from tri-n-octylphosphine oxide with $AlCl_3$ respectively $TiCl_4$. However, only Diels-Alder reactions of these complexes are disclosed, polymerization of isobutene is not rendered obvious.

In these definitions $C_1$-$C_{20}$-alkyl which may be substituted by functional groups, aryl, alkyl, aryloxy, alkyloxy, halogen, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, eicosyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethyl-aminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, and $C_2$-$C_{20}$-alkyl interrupted by one or more oxygen and/or sulphur atoms and/or one or more substituted or unsubstituted imino groups is, for example, 5-hydroxy-3-oxa-pentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxa-undecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

If two radicals form a ring, they can together be 1,3-propylene, 1,4-butylene, 1,5-pentylene, 2-oxa-1,3-propylene, 1-oxa-1,3-propylene, 2-oxa-1,3-propylene, 1-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of oxygen and/or sulphur atoms and/or imino groups is not subject to any restrictions. In general, there will be no more than 5 in the radical, preferably no more than 4 and very particularly preferably no more than 3.

Furthermore, there is generally at least one carbon atom, preferably at least two carbon atoms, between any two heteroatoms.

Substituted and unsubstituted imino groups can be, for example, imino, methylimino, isopropylimino, n-butylimino or tert-butylimino.

Furthermore, functional groups can be carboxy, carboxamide, hydroxy, di($C_1$-$C_4$-alkyl)amino, $C_1$-$C_4$-alkyloxycarbonyl, cyano or $C_1$-$C_4$-alkyloxy, $C_6$-$C_{12}$-aryl which may be substituted by functional groups, aryl, alkyl, aryloxy, alkyloxy, halogen, heteroatoms and/or heterocycles is, for example, phenyl, tolyl, xylyl, $\alpha$-naphthyl, p-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl, $C_5$-$C_{12}$-cycloalkyl which may be substituted by functional groups, aryl, alkyl, aryloxy, alkyloxy, halogen, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl, a five- or six-membered, oxygen-, nitrogen- and/or sulphur-containing heterocycle is, for example, furyl, thienyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthienyl, isopropylthienyl or tert-butylthienyl and $C_1$ to $C_4$-alkyl is, for example, methyl, ethyl, propyl, isopropyl, n-butyl, sec-butyl or tert-butyl.

The residues $R^1$ to $R^5$ are preferably $C_2$-$C_{13}$-alkyl or $C_6$-$C_{12}$-aryl, more preferably $C_4$-$C_{16}$-alkyl or $C_6$-$C_{12}$-aryl, and even more preferably $C_4$-$C_{16}$-alkyl or $C_6$-aryl.

The residues $R^1$ to $R^5$ may be saturated or unsaturated, preferably saturated.

The residues $R^1$ to $R^5$ as well as $X_1$, $X_2$, and $X_3$ may each be the same or different, in one embodiment of the present invention they are each the same.

Preferred residues $R^1$ to $R^5$ do not bear any heteroatoms other than carbon of hydrogen.

Preferred compounds of formula (I) or (Ia) or (Ib) are tri-n-hexylphosphine oxide, tri-n-octylphosphine oxide ($P_{888}O$), tri iso-nonyl phosphine oxide, tri-n-decylphosphine oxide, tri-n-dodecylphosphine oxide, tri iso-tridecyl phosphine oxide, tri-n-tetradecylphosphine oxide, tri iso-heptadecyl phosphine oxide, triphenylphosphine oxide ($PPh_3O$), tritolylphosphine oxide, trinaphtylphosphine oxide, phosphorous acid tri (n-butyl) ester, phosphorous acid tri (n-hexyl) ester, phosphorous acid tri (2-ethylhexyl) ester, phosphorous acid tri (n-octyl) ester, phosphorous acid tri (2-propylheptyl) ester, phosphorous acid tri (n-decyl) ester, phosphorous acid tri (n-dodecyl) ester, phosphorous acid tri (n-tetradecyl) ester, phosphorous acid tri (n-hexadecyl) ester, tri-ethylphosphite, tri-n-butylphosphite, tri-n-hexylphosphite, tri-n-octylphosphite, tri iso-nonyl phosphite, tri-n-decylphosphite, tri-n-dodecylphosphite, tri iso-tridecyl phosphite, tri-n-tetradecylphosphite, tri iso-heptadecyl phosphite, triphenylphosphite, penta(ethoxy)phosphorane, penta(n-butyloxy)phosphorane, penta(hexyloxy)phosphorane, penta(n-octyloxy)phosphorane, penta(2-ethylhexyloxy)phosphorane, and penta(phenoxy)phosphorane.

Furthermore active are the corresponding phosphinites ($P(OR^1)R^2_2$), phosphonites ($P(OR^1)_2R^2$), and phosphonates ($OP(OR^1)_2R^2$), such as diethyl phenyl phosphinite, di-n-butyl phenyl phosphinite, di(2-ethylhexyl) phenyl phosphinite, ethyl diphenyl phosphonite, n-butyl diphenyl phosphonite, (2-ethylhexyl) diphenyl phosphonite, diethyl phenyl phosphonate, di-n-butyl phenyl phosphonate, and di(2-ethylhexyl) phenyl phosphonate.

In the case of the phosphorous acid esters the alcohol component may be a mixture of fatty acid alcohols derived from fatty acid mixtures which are obtainable industrially from the work-up of natural, vegetable or animal fats and oils, particularly preferably from linseed oil, coconut oil, palm kernel oil, palm oil, soy oil, peanut oil, cocoa butter, shea butter, cottonseed oil, maize oil, sunflower oil, rapeseed oil or castor oil, very particularly preferably from linseed oil, palm oil, soy oil, peanut oil, cocoa butter, shea butter, cottonseed oil, maize oil, sunflower oil, rapeseed oil or castor oil.

Another object of the present invention are an iron trihalide-donor complexes consisting of at least one iron trihalide,

- optionally at least one organic compound (II) comprising at least one oxygen or nitrogen atom with at least one lone electron pair, preferably comprising at least one oxygen atom with at least one lone electron pair, very preferably selected from the group consisting of organic compounds with at least one ether function, organic compounds with at least one carboxylic ester function, organic compounds with at least one aldehyde function, organic compounds with at least one keto function, and organic compounds with at least one nitrogen containing heterocyclic ring, and
- at least one phosphorus-containing compound of formula (I)

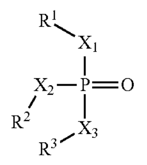

or formula (Ia)

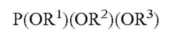

$P(OR^1)(OR^2)(OR^3)$ or formula (Ib)

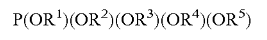

$P(OR^1)(OR^2)(OR^3)(OR^4)(OR^5)$ in which $X_1$, $X_2$, and $X_3$ independently of another are oxygen, sulphur or a single bond, preferably oxygen or a single bond, and very preferably a single bond, and $R^1$, $R^2$, $R^3$, $R^4$, and $R^5$ independently of another are an organic residue with up to 20 carbon atoms.

In one preferred embodiment of this object of the invention the compound (II) is present.

A further embodiment of this object of the invention are iron trihalide-donor complexes in which the complex formed from the at least one iron trihalide and the at least one phosphorus-containing compound of formula (I) or (Ia) or (Ib) have a melting point of not more than 60° C., preferably not more than 40° C., and especially not more than than 20° C.

In a further embodiment of this object of the invention the molar ratio of iron trihalide, compound of formula (II) and compound of formula (I) or (Ia) or (Ib) in such iron trihalide-donor complexes is generally from 1:0 to 10:0.1 to 10, preferably from 1:0.1 to 10:0.2 to 5, more preferably from 1:0.2 to 5:0.3 to 3.

Another object of the present invention is the use of such iron trihalide-donor complexes as a catalyst for the polymerisation of unsaturated monomers, preferably for the cationic polymerisation of unsaturated monomers, more preferably of ethylenically unsaturated monomers, even more preferably of alkenes, and especially for isobutene-containing monomer mixtures.

Another especially preferred object of the present invention are boron trihalide-donor complexes consisting of at least one boron trihalide, optionally at least one organic compound (II) comprising at least one oxygen or nitrogen atom with at least one lone electron pair, preferably comprising at least one oxygen atom with at least one lone electron pair, very preferably selected from the group consisting of organic compounds with at least one ether function, organic compounds with at least one carboxylic ester function, organic compounds with at least one aldehyde function, organic compounds with at least one keto function, and organic compounds with at least one nitrogen containing heterocyclic ring, and at least one phosphorus-containing compound of formula (I)

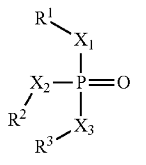

or formula (Ia)

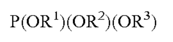

$P(OR^1)(OR^2)(OR^3)$ or formula (Ib)

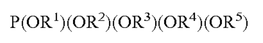

$P(OR^1)(OR^2)(OR^3)(OR^4)(OR^5)$ in which $X_1$, $X_2$, and $X_3$ independently of another are oxygen, sulphur or a single bond, preferably oxygen or a single bond, and very preferably a single bond, and $R^1$, $R^2$, $R^3$, $R^4$, and $R^5$ independently of another are an organic residue with up to 20 carbon atoms.

In one embodiment of this object of the invention the compound (II) is present.

A further embodiment of this object of the invention are boron trihalide-donor complexes in which the complex formed from the at least one boron trihalide and the at least one phosphorus-containing compound of formula (I) or (Ia) or (Ib) have a melting point of not more than 60° C., preferably not more than 40° C., and especially not more than 20° C.

In a further embodiment of this object of the invention the molar ratio of boron trihalide, compound of formula (II) and compound of formula (I) or (Ia) or (Ib) in such boron trihalide-donor complexes is generally from 1:0 to 10:0.1 to 10, preferably from 1:0.1 to 10:0.2 to 5, more preferably from 1:0.2 to 5:0.3 to 3.

Another object of the present invention is the use of such boron trihalide-donor complexes as a catalyst for the polymerisation of unsaturated monomers, preferably for the cationic polymerisation of unsaturated monomers, more preferably of ethylenically unsaturated monomers, even more preferably of alkenes, and especially for isobutene-containing monomer mixtures.

Another object of the present invention are metal halide-donor complexes consisting of at least one metal halide, selected from the group consisting of aluminum trihalide, alkylaluminum halide, gallium trihalide, titanium tetrahalide, zinc dihalide, tin dihalide, tin tetrahalide, and boron trihalide, at least one organic compound (II) comprising at least one oxygen or nitrogen atom with at least one lone electron pair, preferably comprising at least one oxygen atom with at least one lone electron pair, very preferably selected from the group consisting of organic compounds with at least one ether function, organic compounds with at least one carboxylic ester function, organic compounds with at least one aldehyde function, organic compounds with at least one keto function, and organic compounds with at least one nitrogen containing heterocyclic ring, and at least one phosphorus-containing compound of formula (I)

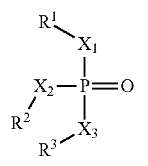

or formula (Ia)

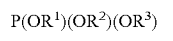

$P(OR^1)(OR^2)(OR^3)$ or formula (Ib)

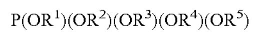

$P(OR^1)(OR^2)(OR^3)(OR^4)(OR^5)$ in which $X_1$, $X_2$, and $X_3$ independently of another are oxygen, sulphur or a single bond, preferably oxygen or a single bond, and very preferably a single bond, and $R^1$, $R^2$, $R^3$, $R^4$, and $R^5$ independently of another are an organic residue with up to 20 carbon atoms.

The metal halide is preferably selected from the group consisting of aluminum trihalide, alkylaluminum halide, titanium tetrahalide, tin tetrahalide, and boron trihalide, more preferably selected from the group consisting of aluminum trihalide, alkylaluminum halide, titanium tetrahalide, and boron trihalide, even more preferably selected from the group consisting of aluminum trihalide, alkylaluminum halide, and boron trihalide, and especially the metal halide is aluminum trihalide or even aluminum trichloride.

A further embodiment of this object of the invention are such metal halide-donor complexes in which the complex formed from the at least one metal halide and the at least one phosphorus-containing compound of formula (I) or (Ia) or (Ib) have a melting point of not more than 60° C., preferably not more than 40° C., and especially not more than 20° C.

In a further embodiment of this object of the invention the molar ratio of such metal halide, compound of formula (II) and compound of formula (I) or (Ia) or (Ib) in such metal halide-donor complexes is generally from 1:0 to 10:0.1 to 10, preferably from 1:0.1 to 10:0.2 to 5, more preferably from 1:0.2 to 5:0.3 to 3.

Another object of the present invention is the use of such metal halide-donor complexes as a catalyst for the polymerisation of unsaturated monomers, preferably for the cationic polymerisation of unsaturated monomers, more preferably of ethylenically unsaturated monomers, even more preferably of alkenes, and especially for isobutene-containing monomer mixtures.

Isobutene homopolymers are understood in the context of the present invention to mean those polymers which, based on the polymer, are formed from isobutene to an extent of at least 98 mol %, preferably to an extent of at least 99 mol %. Accordingly, isobutene copolymers are understood to mean those polymers which comprise less than 2 mol %, preferably less than 1 mol %, very preferably less than 0.7 mol % and especially less than 0.5 mol % of copolymerized monomers other than isobutene, for example isoprene or linear butenes, preferably 1-butene, cis-2-butene, and trans-2-butene.

In the context of the present invention, the following definitions apply to generically defined radicals:

A $C_1$- to $C_8$-alkyl radical is a linear or branched alkyl radical having 1 to 8 carbon atoms. Examples thereof are methyl, ethyl, n-propyl, isopropyl, n-butyl, 2-butyl, isobutyl, tert-butyl, pentyl, 1-methylbutyl, 2-methylbutyl, 3-methylbutyl, 2,2-dimethyl-propyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl and the constitutional isomers thereof, such as 2-ethylhexyl. Such $C_1$—to $C_8$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_1$—to $C_{20}$-alkyl radical is a linear or branched alkyl radical having 1 to 20 carbon atoms. Examples thereof are the abovementioned $C_1$—to $C_8$-alkyl radicals, and additionally n-nonyl, isononyl, n-decyl, 2-propylheptyl, n-undecyl, n-dodecyl, n-tridecyl, isotridecyl, n-tetradecyl, n-hexadecyl, n-octadecyl and n-eicosyl. Such $C_1$—to $C_{20}$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_5$—to $C_8$-cycloalkyl radical is a saturated cyclic radical which may comprise alkyl side chains. Examples thereof are cyclopentyl, 2- or 3-methylcyclopentyl, 2,3-, 2,4- or 2,5-dimethylcyclopentyl, cyclohexyl, 2-, 3- or 4-methylcyclohexyl, 2,3-, 2,4-, 2,5-, 2,6-, 3,4-, 3,5- or 3,6-dimethylcyclohexyl, cycloheptyl, 2-, 3- or 4-methylcycloheptyl, cyclooctyl, 2-, 3-, 4- or 5-methylcyclooctyl. Such $C_5$—to $C_8$-cycloalkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_6$—to $C_{20}$-aryl radical or a $C_6$—to $C_{12}$-aryl radical is preferably optionally substituted phenyl, optionally substituted naphthyl, optionally substituted anthracenyl or optionally substituted phenanthrenyl. Such aryl radicals may be a 1 to 5 aprotic substituents or aprotic functional groups, for example $C_1$—to $C_8$-alkyl, $C_1$—to $C_8$-haloalkyl such as $C_1$—to $C_8$-chloroalkyl or $C_1$—to $C_8$-fluoroalkyl, halogens such as chlorine or fluorine, nitro, cyano or phenyl. Examples of such aryl radicals are phenyl, naphthyl, biphenyl, anthracenyl, phenanthrenyl, tolyl, nitrophenyl, chlorophenyl, dichlorophenyl, pentafluorophenyl, pentachlorophenyl, (trifluoromethyl)phenyl, bis(trifluoromethyl)phenyl, (trichloro)methylphenyl and bis(trichloromethyl)phenyl.

A $C_7$—to $C_{20}$-arylalkyl radical or a $C_7$—to $C_{12}$-arylalkyl radical is preferably optionally substituted $C_1$—to $C_4$-alkylphenyl such as benzyl, o-, m- or p-methylbenzyl, 1- or 2-phenylethyl, 1-, 2- or 3-phenylpropyl or 1-, 2-, 3- or 4-phenylbutyl, optionally substituted $C_1$—to $C_4$-alkylnaphthyl such as naphthylmethyl, optionally substituted $C_1$—to $C_4$-alkylanthracenyl such as anthracenylmethyl, or optionally substituted $C_1$—to $C_4$-alkylphenanthrenyl such as phenanthrenylmethyl. Such arylalkyl radicals may bear 1 to 5 aprotic substituents or aprotic functional groups, especially on the aryl moiety, for example $C_1$—to $C_8$-alkyl, $C_1$—to $C_8$-haloalkyl such as $C_1$—to $C_8$-chloroalkyl or $C_1$—to $C_8$-fluoroalkyl, halogen such as chlorine or fluorine, nitro or phenyl.

A suitable aluminum trihalide is especially aluminum trifluoride, aluminum trichloride or aluminum tribromide, preferably aluminum trichloride.

A useful alkylaluminum halide is especially a mono($C_1$—to $C_4$-alkyl)aluminum dihalide or a di($C_1$—to $C_4$-alkyl) aluminum monohalide, for example methylaluminum dichloride, ethylaluminum dichloride, iso-butylaluminum dichloride, dimethylaluminum chloride or diethylaluminum chloride, diiso-butylaluminum chloride, preferably ethylaluminum dichloride, iso-butylaluminum dichloride, diethylaluminum chloride or diiso-butylaluminum chloride and very preferably ethylaluminum dichloride and iso-butylaluminum dichloride.

Especially suitable iron trihalides are iron trifluoride, iron trichloride or iron tribromide, preferably iron trichloride.

Especially suitable gallium trihalides are gallium trifluoride, gallium trichloride or gallium tribromide, preferably gallium trichloride.

Especially suitable titanium tetrahalides are titanium tetrafluorides, titanium tetrachlorides or titanium tetrabromides, preferably titanium tetrachlorides.

Especially suitable zinc dihalides are zinc difluorides, zinc dichlorides, or zinc dibromides, preferably zinc dichlorides.

Especially suitable tin dihalides are tin difluorides, tin dichlorides, or tin dibromides, preferably tin dichlorides.

Especially suitable tin tetrahalides are tin tetrafluorides, tin tetrachlorides, or tin tetrabromides, preferably tin tetrachlorides.

Especially suitable boron trihalides are boron trifluoride, boron trichloride, and boron tribromide, preferably boron trifluoride and boron trichloride, and more preferably boron trifluoride.

Among these Lewis Acids, aluminum trihalides, alkylaluminum halides, iron trihalides, titanium tetrahalides, and boron trihalides are preferred.

Very preferred are aluminum trihalides, alkylaluminum halides, iron trihalides, and boron trihalides, particularly preferred are aluminum trihalides, especially aluminium trichloride.

In a preferred embodiment, isobutene or an isobutene-comprising monomer mixture is polymerized in the presence of an alkyl aluminum dichloride-donor complex or an dialkyl aluminum chloride-donor complex effective as a polymerization catalyst, very preferably in the presence of an aluminum trichloride-donor complex or an iron trichloride-donor complex.

The molar ratio of Lewis Acid to compound of formula (I) or (Ia) or (Ib) is generally from 1:0.1 to 10, preferably from 1:0.2 to 5, more preferably from 1:0.3 to 3, even more preferably from 1:0.4 to 2, and especially from 1:0.5 to 1, with the above-mentioned proviso that the complex formed from the at least one Lewis Acid and the at least one phosphorus-containing compound of formula (I) or (Ia) or (Ib) has a melting point of not more than 60° C., preferably not more than 40° C., and especially not more than 20° C.

It is an inevitable aspect of the present invention that the complex formed from the at least one Lewis Acid and the at least one phosphorus-containing compound of formula (I) or (Ia) or (Ib) has a melting point of not more than 60° C., preferably not more than 40° C., and especially not more than 20° C., preferably of not more than 10° C., and more preferably of not more than 0° C. (determined by Differential Scanning Calorimetry at a heating rate of 5° C./min in the range of −20° C. to 150° C.).

According to the invention the aluminum trihalide-donor complex or alkylaluminum halide-donor complex or the iron trihalide-donor complex or the gallium trihalide-donor complex or the titanium tetrahalide-donor complex or the zinc dihalide-donor complex or the tin dihalide-donor complex or the tin tetrahalide-donor complex or the boron trihalide-donor complex effective as a polymerization catalyst comprises, as the donor, a mixture of at least one organic compound (II) comprising at least one oxygen or nitrogen atom with at least one lone electron pair, preferably comprising at least one oxygen atom with at least one lone electron pair, very preferably selected from the group consisting of organic compounds with at least one ether function, organic compounds with at least one carboxylic ester function, organic compounds with at least one aldehyde function, organic compounds with at least one keto function, and organic compounds with at least one nitrogen containing heterocyclic ring with at least one compound of formula (I) or (Ia) or (Ib), as defined above, with the proviso that the complex formed from the at least one Lewis Acid and the at least one phosphorus-containing compound of formula (I) or (Ia) or (Ib) has a melting point of not more than 60° C., preferably not more than 40° C., and especially not more than 20° C.

Compounds of formula (I) are preferred over compounds of formula (Ia) or (Ib).

Compounds (II) comprise at least one oxygen and/or nitrogen atom with at least one lone electron pair, preferably at least one oxygen atom with at least one lone electron pair and very preferably are selected from the group consisting of organic compounds with at least one ether function, organic compounds with at least one carboxylic ester function, organic compounds with at least one aldehyde function, organic compounds with at least one keto function, and organic compounds with at least one nitrogen containing heterocyclic ring.

Solely oxygen containing compounds (II) are preferred over nitrogen-containing compounds (II).

Preferably compound (II) is selected from the group consisting of organic compounds with at least one ether function, organic compounds with at least one carboxylic ester function and organic compounds with at least one keto function, more preferably selected from the group consisting of organic compounds with at least one ether function and organic compounds with at least one carboxylic ester function, very preferably compounds (II) are organic compounds with at least one ether function, and especially organic compounds with exactly one ether function.

Compounds with at least one ether function are also understood to mean acetals and hemiacetals. The ether compound may comprise one or more ether functions, e.g. one, two, three, four or even more ether functions, preferably one or two ether functions and very preferably one ether function.

The mixture of donors may comprise one, two, three, four or even more different compounds (II), preferably compounds with at least one ether function, preferably one or two different compounds and very preferably one compound.

In a preferred embodiment of the present invention, an aluminum trihalide-donor complex or an alkylaluminum halide complex, or an iron trihalide-donor complex, or a gallium trihalide-donor complex or a titanium tetrahalide-donor complex or a zinc dihalide-donor complex or a tin dihalide-donor complex or the tin tetrahalide-donor complex or the boron trihalide-donor complex, very preferably an aluminum trihalide-donor complex or an iron trihalide-donor complex or a boron trihalide-donor complex and especially an aluminum trihalide-donor complex is used, which comprises, as the donor, a mixture of at least one dihydrocarbyl ether the general formula $R^8—O—R^9$ in which the variables $R^8$ and $R^9$ are each independently $C_1$—to $C_{20}$-alkyl radicals, preferably $C_1$—to $C_8$ alkyl radicals especially $C_1$—to $C_4$ alkyl radicals, $C_1$—to $C_{20}$-haloalkyl radicals, preferably $C_1$—to $C_8$ haloalkyl radicals especially $C_1$—to $C_4$ haloalkyl radicals, $C_5$—to $C_8$-cycloalkyl radicals, preferably $C_5$—to $C_6$-cycloalkyl radicals, $C_6$—to $C_{20}$-aryl radicals, especially $C_6$—to $C_{12}$ aryl radicals, $C_6$—to $C_{20}$-haloaryl radicals, especially $C_6$—to $C_{12}$ haloaryl radicals, or $C_7$—to $C_{20}$-arylalkyl radicals, especially $C_7$—to $C_{12}$-arylalkyl radicals. Preference is given to $C_1$—to $C_4$ alkyl radicals, $C_1$—to $C_4$ haloalkyl radicals, $C_6$—to $C_{12}$ aryl radicals, and $C_7$—to $C_{12}$-arylalkyl radicals with at least one compound of formula (I) or (Ia) or (Ib), with the proviso that the complex formed from the at least one Lewis Acid and the at least one phosphorus-containing compound of formula (I) or (Ia) or (Ib) has a melting point of not more than 60° C., preferably not more than 40° C., and especially not more than 20° C.

Haloalkyl and haloaryl mean preferably chloroalkyl or bromoalkyl and chloroaryl or bromoaryl, very preferably chloroalkyl and chloroaryl. Especially preferred are w-haloalkyl radicals.

Preferred examples are chloromethyl, 1-chloroeth-1-yl, 2-chloroeth-1-yl, 2-chloroprop-1-yl, 2-chloroprop-2-yl, 3-chloroprop-1-yl, and 4-chlorobut-1-yl.

Preferred examples for chloroaryl are 2-chlorophenyl, 3-chlorophenyl, and 4-chlorophenyl.

The dihydrocarbyl ethers mentioned may be open-chain or cyclic, where the two variables $R^8$ and $R^9$ in the case of the cyclic ethers may join to form a ring, where such rings may also comprise two or three ether oxygen atoms. Examples of such open-chain and cyclic dihydrocarbyl ethers are dimethyl ether, chloromethyl methyl ether, bis (chloromethyl) ether, diethyl ether, chloromethyl ethyl ether, 2-chloroethyl ethyl ether (CEE), bis (2-chloroethyl) ether (CE), di-n-propyl ether, diisopropyl ether, di-n-butyl ether, di-sec-butyl ether, diisobutyl ether, di-n-pentyl ether, di-n-hexyl ether, di-n-heptyl ether, di-n-octyl ether, di-(2-ethylhexyl) ether, methyl n-butyl ether, methyl sec-butyl ether, methyl isobutyl ether, methyl tert-butyl ether, ethyl n-butyl ether, ethyl sec-butyl ether, ethyl isobutyl ether, ethyl tert-butyl ether, n-propyl-n-butyl ether, n-propyl sec-butyl ether, n-propyl isobutyl ether, n-propyl tert-butyl ether, isopropyl n-butyl ether, isopropyl sec-butyl ether, isopropyl isobutyl ether, isopropyl tert-butyl ether, methyl n-hexyl ether, methyl n-octyl ether, methyl 2-ethylhexyl ether, ethyl n-hexyl ether, ethyl n-octyl ether, ethyl 2-ethylhexyl ether, n-butyl n-octyl ether, n-butyl 2-ethylhexyl ether, tetrahydrofuran, tetrahydropyran, 1,2-, 1,3- and 1,4-dioxane, dicyclohexyl ether, diphenyl ether, alkyl aryl ethers, such as anisole and phenetole, ditolyl ether, dixylyl ether and dibenzyl ether.

Furthermore, difunctional ethers such as dialkoxybenzenes, preferably dimethoxybenzenes, very preferably veratrol, and ethylene glycol dialkylethers, preferably ethylene glycol dimethylether and ethylene glycol diethylether, are preferred.

Among the dihydrocarbyl ethers mentioned, diethyl ether, 2-chloroethyl ethyl ether, diisopropyl ether, di-n-butyl ether and diphenyl ether have been found to be particularly advantageous as donors for the aluminum trihalide-donor complexes or the alkylaluminum halide complexes or the iron trihalide-donor complexes or the gallium trihalide-donor complex or the titanium tetrahalide-donor complex or the zinc dihalide-donor complex or the tin dihalide-donor complex or the tin tetrahalide-donor complex or the boron trihalide-donor complex, very preferably the aluminum trihalide-donor complexes or iron trihalide-donor complexes or boron trihalide-donor complex and especially the aluminum trihalide-donor complexes.

In a preferred embodiment dihydrocarbyl ethers with at least one secondary or tertiary dihydrocarbyl group are preferred over dihydrocarbyl groups with primary groups only. Ethers with primary dihydrocarbyl groups are those ethers in which both dihydrocarbyl groups are bound to the ether functional group with a primary carbon atom, whereas ethers with at least one secondary or tertary dihydrocarbyl group are those ethers in which at least one dihydrocarbyl group is bound to the ether functional group with a secondary or tertiary carbon atom.

For the sake of clarity, e.g. diisobutyl ether is deemed to be an ether with primary dihydrocarbyl groups, since the secondary carbon atom of the isobutyl group is not bound to the oxygen of the functional ether group but the hydrocarbyl group is bound via a primary carbon atom.

Preferred examples for ethers with primary dihydrocarbyl groups are diethyl ether, di-n-butyl ether, and di-n-propyl ether.

Preferred examples for ethers with at least one secondary or tertary dihydrocarbyl group are diisopropyl ether, methyl tert-butyl ether, ethyl tert-butyl ether, and anisole.

In addition, particularly advantageous dihydrocarbyl ethers as donors for the aluminum trihalide-donor complexes or the alkylaluminum halide complexes, have been found to be those in which the donor compound has a total carbon number of 3 to 16, preferably of 4 to 16, especially of 4 to 12, in particular of 4 to 8.

In another preferred embodiment halide-substituted ethers are preferred in combination with aluminum halide-donor complex or iron halide-donor complex or boron halide-donor complex.

Organic compounds with at least one carboxylic ester function are preferably hydrocarbyl carboxylates of the general formula $R^{10}$—$COOR^{11}$ in which the variables $R^{10}$ and $R^{11}$ are each independently $C_1$—to $C_{20}$-alkyl radicals, especially $C_1$—to $C_8$ alkyl radicals, $C_5$—to $C_8$-cycloalkyl radicals, $C_6$—to $C_{20}$-aryl radicals, especially $C_6$—to $C_{12}$ aryl radicals, or $C_7$—to $C_{20}$-arylalkyl radicals, especially $C_7$—to $C_{12}$-arylalkyl radicals.

Examples of the hydrocarbyl carboxylates mentioned are methyl formate, ethyl formate, n-propyl formate, isopropyl formate, n-butyl formate, sec-butyl formate, isobutyl formate, tert-butyl formate, methyl acetate, ethyl acetate, n-propyl acetate, isopropyl acetate, n-butyl acetate, sec-butyl acetate, isobutyl acetate, tert-butyl acetate, methyl propionate, ethyl propionate, n-propyl propionate, isopropyl propionate, n-butyl propionate, sec-butyl propionate, isobutyl propionate, tert-butyl propionate, methyl butyrate, ethyl butyrate, n-propyl butyrate, isopropyl butyrate, n-butyl butyrate, sec-butyl butyrate, isobutyl butyrate, tert-butyl butyrate, methyl cyclohexanecarboxylate, ethyl cyclohexanecarboxylate, n-propyl cyclohexanecarboxylate, isopropyl cyclohexanecarboxylate, n-butyl cyclohexanecarboxylate, sec-butyl cyclohexanecarboxylate, isobutyl cyclohexanecarboxylate, tert-butyl cyclohexanecarboxylate, methyl benzoate, ethyl benzoate, n-propyl benzoate, isopropyl benzoate, n-butyl benzoate, sec-butyl benzoate, isobutyl benzoate, tert-butyl benzoate, methyl phenylacetate, ethyl phenylacetate, n-propyl phenylacetate, isopropyl phenylacetate, n-butyl phenylacetate, sec-butyl phenylacetate, isobutyl phenylacetate and tert-butyl phenylacetate. Among the hydrocarbyl carboxylates mentioned, ethyl acetate has been found to be particularly advantageous as a donor for the complexes.

In addition, particularly advantageous hydrocarbyl carboxylates as donors, have been found to be those in which the donor compound has a total carbon number of 3 to 16, preferably of 4 to 16, especially of 4 to 12, in particular of 4 to 8, preference is given in particular to those having a total of 3 to 10 and especially 4 to 6 carbon atoms.

Organic compounds with at least one aldehyde function, preferably exactly one aldehyde function and organic compounds with at least one keto function, preferably exactly one keto function typically have from 1 to 20, preferably from 2 to 10 carbon atoms. Functional groups other than the carbonyl group are preferably absent.

Preferred organic compounds with at least one aldehyde function are those of formula $R^{10}$—CHO, in which $R^{10}$ has the above-mentioned meaning, very preferably are selected from the group consisting of formaldehyde, acetaldehyde, propionaldehyde, n-butyraldehyde, isobutyraldehyde, and benzaldehyde.

Preferred organic compounds with at least one keto function are those of formula $R^{10}$—(C═O)—$R^{11}$, in which $R^{10}$ and $R^{11}$ have the above-mentioned meaning, very preferably are selected from the group consisting of acetone, methyl ethyl ketone, diethyl ketone, methyl isobutyl ketone, cyclohexanone, acetophenone, and benzophenone. Greatest preference is given to acetone.

Organic compounds with at least one nitrogen containing heterocyclic ring are preferably saturated, partly unsaturated or unsaturated nitrogen-containing five-membered or six-membered heterocyclic rings which comprises one, two or three ring nitrogen atoms and may have one or two further ring heteroatoms from the group of oxygen and sulphur and/or hydrocarbyl radicals, especially $C_1$—to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2,5-triazine, 1,2,5-oxathiazine, 2H-1,3,5-thiadiazine or morpholine.

However, a very particularly suitable nitrogen-containing basic compound of this kind is pyridine or a derivative of pyridine (especially a mono-, di- or tri-$C_1$—to $C_4$-alkyl-substituted pyridine) such as 2-, 3-, or 4-methylpyridine (picolines), 2,3-, 2,4-, 2,5-, 2,6-, 3,4-, 3,5- or 3,6-dimethylpyridine (lutidines), 2,4,6-trimethylpyridine (collidine), 2-, 3-, or 4-tert-butylpyridine, 2-tert-butyl-6-methylpyridine, 2,4-, 2,5-, 2,6- or 3,5-di-tert-butylpyridine or else 2-, 3-, or 4-phenylpyridine.

The molar ratio of the donor compounds (calculated as the sum of compound (II), preferably sum of ethers plus the sum of compounds of formula (I) or (Ia) or (Ib) in the mixture) mentioned to the aluminum trihalide or to the alkylaluminum halide or to the iron trihalide or to the gallium trihalide or to the titanium tetrahalide or to the zinc dihalide or to the tin dihalide or to the tin tetrahalide or to the boron trihalide, in the donor complex generally varies within the range from 0.4:1 to 2.0:1, especially from 0.5:1 to 1.8:1, in particular 0.7:1 to 1.6:1; in most cases it is 0.9:1 to 1.5:1. However, it is also possible to work with a greater excess of the donor compounds, often up to a 10-fold and especially 3-fold molar excess; the excess amount of donor compounds then additionally acts as a solvent or diluent.

The molar ratio of compound (II), preferably the ether compounds (calculated as the sum of compounds (II) respectively the sum of ethers) to the compounds of formula (I) or (Ia) or (Ib) (calculated as the sum of compounds of formula (I) or (Ia) or (Ib)) in the mixture generally varies from 0.1:1 to 1:0.1, preferably from 0.2:1 to 1:0.2, very preferably from 0.25:1 to 1:0.5, more preferably from 0.3:1 to 1:0.66, especially from 0.3:1 to 1:1, and even from 0.35:1 to 1:1. In a preferable embodiment the compounds (II) respectively the ethers are present in an equimolar molar ratio.

The molar ratio of the Lewis Acid mentioned, preferably the aluminum trihalide or alkylaluminum halide mentioned to the isobutene monomer used in the case of homopolymerization of isobutene, or to the total amount of the polymerizable monomers used in the case of copolymerization of isobutene, based on each individual functional site of the Lewis Acid mentioned, preferably the aluminum trihalide or alkylaluminum halide, is generally from 0.001:1 to 0.2:1, preferably 0.002:1 to 0.1:1, very preferably 0.003:1 to 0.08:1, especially 0.005:1 to 0.05:1, and in particular 0.007:1 to 0.03:1.

Typically, the Lewis Acid-donor complex, preferably the aluminum trihalide-donor complex or the alkylaluminum halide complex, especially the alkyl aluminum dichloride-donor complex or dialkyl aluminum chloride-donor complex, is prepared separately prior to the polymerization from the respective metal halides, preferably the aluminum trihalide or the alkylaluminum halide, especially from anhydrous alkyl aluminum dichloride or an dialkyl aluminum chloride, and the donor compound, and is then—usually dissolved in an inert solvent such as a halogenated hydrocarbon, for example dichloromethane, or more preferably in unhalogenated hydrocarbons—added to the polymerization medium. However, in a less preferred embodiment the complex can also be prepared in situ prior to the polymerization.

It is an advantage of the present invention that the complexes of the Lewis Acid and the compound of formula (I) or (Ia) or (Ib) are liquid and, therefore, are easily applicable to the reaction medium.

It is a further advantage of the complexes of the Lewis Acid and the compound of formula (I) or (Ia) or (Ib) compared with complexes of a Lewis Acid with ionic liquids that they are much easier to produce by simply mixing Lewis Acid and the compound of formula (I) or (Ia) or (Ib) and the reactivity of the complexes can be varied in a wide range by adjusting the ratio of Lewis Acid and the compound of formula (I) or (Ia) or (Ib).

In case the polymerization catalyst is not fully soluble in the solvent used it may be advantageous to disperse the polymerization catalyst in the inert solvent, e.g. by vigorously stirring the dispersion. The dispersing can be effected in any apparatus suitable for dispersing. Shaking apparatuses such as for example from Skandex may be mentioned by way of example or for example in ultrasonic apparatuses, high pressure homogenizers, 2-, 3-, 4- or 5-roll mills, minimills, Henschel mixers, shaking mills, Ang mills, gear mills, bead mills, wet mills, sand mills, attritors, colloid mills, ultrasonic homogenizers, with Ultra Turrax stirrer and in particular by grinding, for example in 2-, 3-, 4- or 5-roll mills, minimills, shaking mills, Ang mills, gear mills, bead mills, wet mills, sand mills, colloid mills, ball mills, specifically stirred ball mills.

In a preferred embodiment ultrasonication of the Lewis Acid-donor complex, preferably the alumium trihalide-donor complex or the alkylaluminum halide complex, or iron trihalide-donor complexes or boron halide-donor complex in an inert solvent prior to polymerization helps to improve polymerization conversion.

In a preferred embodiment of the present invention, the polymerization is performed with additional use of a mono- or polyfunctional, especially mono-, di- or trifunctional, initiator which is selected from organic hydroxyl compounds, organic halogen compounds and water. It is also possible to use mixtures of the initiators mentioned, for example mixtures of two or more organic hydroxyl compounds, mixtures of two or more organic halogen compounds, mixtures of one or more organic hydroxyl compounds and one or more organic halogen compounds, mixtures of one or more organic hydroxyl compounds and water, or mixtures of one or more organic halogen compounds and water. The initiator may be mono-, di- or polyfunctional, i.e. one, two or more hydroxyl groups or halogen atoms, which start the polymerization reaction, may be present in the initiator molecule. In the case of di- or polyfunctional initiators, telechelic isobutene polymers with two or more, especially two or three, polyisobutene chain ends are typically obtained.

Organic hydroxyl compounds which have only one hydroxyl group in the molecule and are suitable as monofunctional initiators include especially alcohols and phenols, in particular those of the general formula $R^{12}$—OH, in which $R^{12}$ denotes $C_1$—to $C_{20}$-alkyl radicals, especially $C_1$—to $C_8$-alkyl radicals, $C_5$—to $C_8$-cycloalkyl radicals, $C_6$—to $C_{20}$-aryl radicals, especially $C_6$—to $C_{12}$-aryl radicals, or $C_7$—to $C_{20}$-arylalkyl radicals, especially $C_7$—to $C_{12}$-arylalkyl radicals. In addition, the $R^{12}$ radicals may also comprise mixtures of the abovementioned structures and/or have other functional groups than those already mentioned, for example a keto function, a nitroxide or a carboxyl group, and/or heterocyclic structural elements.

Typical examples of such organic monohydroxyl compounds are methanol, ethanol, n-propanol, isopropanol, n-butanol, sec-butanol, isobutanol, tert-butanol, n-pentanol, n-hexanol, n-heptanol, n-octanol, 2-ethylhexanol, cyclohexanol, phenol, p-methoxyphenol, o-, m- and p-cresol, benzyl alcohol, p-methoxybenzyl alcohol, 1- and 2-phenylethanol, 1- and 2-(p-methoxyphenyl)ethanol, 1-, 2- and 3-phenyl-1-propanol, 1-, 2- and 3-(p-methoxyphenyl)-1-propanol, 1- and 2-phenyl-2-propanol, 1- and 2-(p-methoxyphenyl)-2-propanol, 1-, 2-, 3- and 4-phenyl-1-butanol, 1-, 2-, 3- and 4-(p-methoxyphenyl)-1-butanol, 1-, 2-, 3- and 4-phenyl-2-butanol, 1-, 2-, 3- and 4-(p-methoxyphenyl)-2-butanol, 9-methyl-9H-fluoren-9-ol, 1,1-diphenylethanol, 1,1-diphenyl-2-propyn-1-ol, 1,1-diphenylpropanol, 4-(1-hydroxy-1-phenylethyl)benzonitrile, cyclopropyldiphenylmethanol, 1-hydroxy-1,1-diphenylpropan-2-one, benzilic acid, 9-phenyl-9-fluorenol, triphenylmethanol, diphenyl(4-pyridinyl)methanol, alpha,alpha-diphenyl-2-pyridinemethanol, 4-methoxytrityl alcohol (especially polymer-bound as a solid phase), alpha-tert-butyl-4-chloro-4'-methylbenzhydrol, cyclohexyldiphenylmethanol, alpha-(p-tolyl)-benzhydrol, 1,1,2-triphenylethanol, alpha,alpha-diphenyl-2-pyridineethanol, alpha,alpha-4-pyridylbenzhydrol N-oxide, 2-fluorotriphenylmethanol, triphenylpropargyl alcohol, 4-[(diphenyl)hydroxymethyl]benzonitrile, 1-(2,6-dimethoxyphenyl)-2-methyl-1-phenyl-1-propanol, 1,1,2-triphenylpropan-1-ol and p-anisaldehyde carbinol.

Organic hydroxyl compounds which have two hydroxyl groups in the molecule and are suitable as bifunctional initiators are especially dihydric alcohols or diols having a total carbon number of 2 to 30, especially of 3 to 24, in particular of 4 to 20, and bisphenols having a total carbon number of 6 to 30, especially of 8 to 24, in particular of 10 to 20, for example ethylene glycol, 1,2- and 1,3-propylene glycol, 1,4-butylene glycol, 1,6-hexylene glycol, 1,2-, 1,3- or 1,4-bis(1-hydroxy-1-methylethyl)benzene (o-, m- or p-dicumyl alcohol), bisphenol A, 9,10-di-hydro-9,10-dimethyl-9,10-anthracenediol, 1,1-diphenylbutane-1,4-diol, 2-hydroxytriphenylcarbinol and 9-[2-(hydroxymethyl)phenyl]-9-fluorenol.

Organic halogen compounds which have one halogen atom in the molecule and are suitable as monofunctional initiators are in particular compounds of the general formula $R^{13}$-Hal in which Hal is a halogen atom selected from fluorine, iodine and especially chlorine and bromine, and $R^{13}$ denotes $C_1$—to $C_{20}$-alkyl radicals, especially $C_1$—to $C_8$-alkyl radicals, $C_5$—to $C_8$-cycloalkyl radicals or $C_7$—to $C_{20}$-arylalkyl radicals, especially $C_7$—to $C_{12}$-arylalkyl radicals. In addition, the $R^{13}$ radicals may also comprise mixtures of the abovementioned structures and/or have other functional groups than those already mentioned, for example a keto function, a nitroxide or a carboxyl group, and/or heterocyclic structural elements.

Typical examples of such monohalogen compounds are methyl chloride, methyl bromide, ethyl chloride, ethyl bromide, 1-chloropropane, 1-bromopropane, 2-chloropropane, 2-bromopropane, 1-chlorobutane, 1-bromobutane, sec-butyl chloride, sec-butyl bromide, isobutyl chloride, isobutyl bromide, tert-butyl chloride, tert-butyl bromide, 1-chloropentane, 1-bromopentane, 1-chlorohexane, 1-bromohexane, 1-chloroheptane, 1-bromoheptane, 1-chlorooctane, 1-bromooctane, 1-chloro-2-ethylhexane, 1-bromo-2-ethylhexane, cyclohexyl chloride, cyclohexyl bromide, benzyl chloride, benzyl bromide, 1-phenyl-1-chloroethane, 1-phenyl-1-bromoethane, 1-phenyl-2-chloroethane, 1-phenyl-2-bromoethane, 1-phenyl-1-chloropropane, 1-phenyl-1-bromopropane, 1-phenyl-2-chloropropane, 1-phenyl-2-bromopropane, 2-phenyl-2-chloropropane, 2-phenyl-2-bromopropane, 1-phenyl-3-chloropropane, 1-phenyl-3-bromopropane, 1-phenyl-1-chlorobutane, 1-phenyl-1-bromobutane, 1-phenyl-2-chlorobutane, 1-phenyl-2-bromobutane, 1-phenyl-3-chlorobutane, 1-phenyl-3-bromobutane, 1-phenyl-4-chlorobutane, 1-phenyl-4-bromobutane, 2-phenyl-1-chlorobutane, 2-phenyl-1-bromobutane, 2-phenyl-2-chlorobutane, 2-phenyl-2-bromobutane, 2-phenyl-3-chlorobutane, 2-phenyl-3-bromobutane, 2-phenyl-4-chlorobutane and 2-phenyl-4-bromobutane.

Organic halogen compounds which have two halogen atoms in the molecule and are suitable as difunctional initiators are, for example, 1,3-bis(1-bromo-1-methylethyl)benzene, 1,3-bis(2-chloro-2-propyl)benzene (1,3-dicumyl chloride) and 1,4-bis(2-chloro-2-propyl)benzene (1,4-dicumyl chloride).

The initiator is more preferably selected from organic hydroxyl compounds in which one or more hydroxyl groups are each bonded to an $sp^3$-hybridized carbon atom, organic halogen compounds, in which one or more halogen atoms are each bonded to an $sp^3$-hybridized carbon atom, and water. Among these, preference is given in particular to an initiator selected from organic hydroxyl compounds in which one or more hydroxyl groups are each bonded to an $sp^3$-hybridized carbon atom.

In the case of the organic halogen compounds as initiators, particular preference is further given to those in which the one or more halogen atoms are each bonded to a secondary or especially to a tertiary $sp^3$-hybridized carbon atom.

Preference is given in particular to initiators which may bear, on such an $sp^3$-hydridized carbon atom, in addition to the hydroxyl group, the $R^{12}$, $R^{13}$ and $R^{14}$ radicals, which are each independently hydrogen, $C_1$—to $C_{20}$-alkyl, $C_5$—to $C_8$-cycloalkyl, $C_6$—to $C_{20}$-aryl, $C_7$—to $C_{20}$-alkylaryl or phenyl, where any aromatic ring may also bear one or more, preferably one or two, $C_1$—to $C_4$-alkyl, $C_1$—to $C_4$-alkoxy, $C_1$—to $C_4$-hydroxyalkyl or $C_1$—to $C_4$-haloalkyl radicals as substituents, where not more than one of the variables $R^{12}$, $R^{13}$ and $R^{14}$ is hydrogen and at least one of the variables $R^{12}$, $R^{13}$ and $R^{14}$ is phenyl which may also bear one or more, preferably one or two, $C_1$—to $C_4$-alkyl, $C_1$—to $C_4$-alkoxy, $C_1$—to $C_4$-hydroxyalkyl or $C_1$—to $C_4$-haloalkyl radicals as substituents.

For the present invention, very particular preference is given to initiators selected from water, methanol, ethanol, 1-phenylethanol, 1-(p-methoxyphenyl)ethanol, n-propanol, isopropanol, 2-phenyl-2-propanol (cumene), n-butanol, isobutanol, sec.-butanol, tert-butanol, 1-phenyl-1-chloroethane, 2-phenyl-2-chloropropane (cumyl chloride), tert-butyl chloride and 1,3- or 1,4-bis(1-hydroxy-1-methylethyl)benzene. Among these, preference is given in particular to initiators selected from water, methanol, ethanol, 1-phenylethanol, 1-(p-methoxyphenyl)ethanol, n-propanol, isopropanol, 2-phenyl-2-propanol (cumene), n-butanol, isobutanol, sec.-butanol, tert-butanol, 1-phenyl-1-chloroethane and 1,3- or 1,4-bis(1-hydroxy-1-methylethyl)benzene.

The molar ratio of the initiators mentioned to the isobutene monomer used in the case of homopolymerization of isobutene, or to the total amount of the polymerizable monomers used in the case of copolymerization of isobutene, based on each individual functional site of the initiator, is generally from 0.0005:1 to 0.1:1, especially 0.001:1 to 0.075:1, in particular 0.0025:1 to 0.05:1. When water is used as the sole initiator or in combination with organic hydroxyl compounds and/or organic halogen compounds as further initiators, the molar ratio of water to the isobutene monomer used in the case of homopolymerization of isobutene, or to the total amount of the polymerizable monomers used in the case of copolymerization of isobutene, is especially from 0.0001:1 to 0.1:1, in particular 0.0002:1 to 0.05:1, preferably 0.0008:1 to 0.04:1, and very preferably in particular 0.001:1 to 0.03:1.

In a preferred embodiment the amount of initiator in the monomer mixture is not more than 10 wt %, preferably not more than 7.5 wt %, more preferably not more than 5 wt %, even more preferably not more than 3 wt %, and especially not more than 2 wt %.

If water is used as the sole initiator or in combination with organic hydroxyl compounds the amount of initiator in the monomer mixture is not more than 3.2 wt %, preferably not more than 2.5 wt %, more preferably not more than 2 wt %, even more preferably not more than 1.5 wt %, and especially not more than 1 wt %.

A proportion of the initiator molecules added as organic hydroxyl or halogen compounds is incorporated into the polymer chains. The proportion ($I_{eff}$) of polymer chains which are started by such an incorporated organic initiator molecule may be up to 100%, and is generally 5 to 90%. The remaining polymer chains arise either from water originating from traces of moisture as an initiator molecule, or from chain transfer reactions.

In a further preferred embodiment of the present invention, the polymerization is performed in the presence of 0.01 to 10 mmol, especially of 0.05 to 5.0 mmol, in particular of 0.1 to 1.0 mmol, based in each case on 1 mol of isobutene monomer used in the case of homopolymerization of isobutene, or on 1 mol of the total amount of the polymerizable monomers used in the case of copolymerization of isobutene, of a nitrogen-containing basic compound.

Such a nitrogen-containing basic compound used may be an aliphatic, cycloaliphatic or aromatic amine of the general formula $R^{14}—NR^{15}R^{16}$, or else ammonia, in which the variables $R^{14}$, $R^{15}$ and $R^{16}$ are each independently hydrogen, $C_1$—to $C_{20}$-alkyl radicals, especially $C_1$—to $C_8$-alkyl radicals, $C_5$—to $C_8$-cycloalkyl radicals, $C_6$—to $C_{20}$-aryl radicals, especially $C_6$—to $C_{12}$-aryl radicals, or $C_7$—to $C_{20}$-arylalkyl radicals, especially $C_7$—to $C_{12}$-arylalkyl radicals. When none of these variables is hydrogen, the amine is a tertiary amine. When one of these variables is hydrogen, the amine is a secondary amine. When two of these variables is hydrogen, the amine is a primary amine. When all these variables are hydrogen, the amine is ammonia.

Typical examples of such amines of the general formula $R^{14}—NR^{15}R^{16}$ are methylamine, ethylamine, n-propylamine, isopropylamine, n-butylamine, tert-butylamine, sec-butylamine, isobutylamine, tert-amylamine, n-hexylamine, n-heptylamine, n-octylamine, 2-ethylhexylamine, cyclopentylamine, cyclohexylamine, aniline, dimethylamine, diethylamine, di-n-propylamine, diisopropylamine, di-n-butylamine, di-tert-butylamine, di-sec-butylamine, diisobutylamine, di-tertamylamine, di-n-hexylamine, di-n-heptylamine, di-n-octylamine, di-(2-ethylhexyl)amine, dicyclopentylamine, dicyclohexylamine, diphenylamine, trimethylamine, triethylamine, tri-n-propylamine, tri-isopropylamine, tri-n-butylamine, tri-tert-butylamine, tri-sec-butylamine, tri-isobutylamine, tri-tert-amylamine, tri-n-hexylamine, tri-n-heptylamine, tri-n-octylamine, tri-(2-ethylhexyl)amine, tricyclopentylamine, tricyclohexylamine, triphenylamine, dimethylethylamine, methyl-n-butylamine, N-methyl-N-phenylamine, N,N-dimethyl-N-phenylamine, N-methyl-N,N-diphenylamine or N-methyl-N-ethyl-N-n-butylamine.

In addition, such a nitrogen-containing basic compound used may also be a compound having a plurality of, especially having two or three, nitrogen atoms and having 2 to 20 carbon atoms, where these nitrogens may each independently bear hydrogen atoms or aliphatic, cycloaliphatic or aromatic substituents. Examples of such polyamines are 1,2-ethylenediamine, 1,3-propylenediamine, 1,4-butylenediamine, diethylenetriamine, N-methyl-1,2-ethylenediamine, N,N-dimethyl-1,2-ethylenediamine, N,N'-dimethyl-1,2-ethylenediamine or N,N-dimethyl-1,3-propylenediamine.

However, a suitable nitrogen-containing basic compound of this kind is especially a saturated, partly unsaturated or unsaturated nitrogen-containing five-membered or six-membered heterocyclic ring which comprises one, two or three ring nitrogen atoms and may have one or two further ring heteroatoms from the group of oxygen and sulphur and/or hydrocarbyl radicals, especially $C_1$—to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2,5-triazine, 1,2,5-oxathiazine, 2H-1,3,5-thiadiazine or morpholine.

However, a very particularly suitable nitrogen-containing basic compound of this kind is pyridine or a derivative of pyridine (especially a mono-, di- or tri-$C_1$—to $C_4$-alkyl-substituted pyridine) such as 2-, 3-, or 4-methylpyridine (picolines), 2,3-, 2,4-, 2,5-, 2,6-, 3,4-, 3,5- or 3,6-dimethylpyridine (lutidines), 2,4,6-trimethylpyridine (collidine), 2-, 3-, or 4-tert-butylpyridine, 2-tert-butyl-6-methylpyridine, 2,4-, 2,5-, 2,6- or 3,5-di-tert-butylpyridine or else 2-, 3-, or 4-phenylpyridine.

It is possible to use a single nitrogen-containing basic compound or mixtures of such nitrogen-containing basic compounds.

For the use of isobutene or of an isobutene-comprising monomer mixture as the monomer to be polymerized, suitable isobutene sources are both pure isobutene and isobutenic $C_4$ hydrocarbon streams, for example $C_4$ raffinates, especially "raffinate 1", $C_4$ cuts from isobutane dehydrogenation, $C_4$ cuts from steam crackers and from FCC crackers (fluid catalyzed cracking), provided that they have been substantially freed of 1,3-butadiene present therein. A $C_4$ hydrocarbon stream from an FCC refinery unit is also known as "b/b" stream. Further suitable isobutenic $C_4$ hydrocarbon streams are, for example, the product stream of a propylene-isobutane cooxidation or the product stream from a metathesis unit, which are generally used after customary purification and/or concentration. Suitable $C_4$ hydrocarbon streams generally comprise less than 500 ppm, preferably less than 200 ppm, of butadiene. The presence of 1-butene and of cis- and trans-2-butene is substantially uncritical. Typically, the isobutene concentration in the $C_4$ hydrocarbon streams mentioned is in the range from 40 to 60% by weight. For instance, raffinate 1 generally consists essentially of 30 to 50% by weight of isobutene, 10 to 50% by weight of 1-butene, 10 to 40% by weight of cis- and trans-2-butene, and 2 to 35% by weight of butanes; in the polymerization process according to the invention, the unbranched butenes in the raffinate 1 generally behave virtually inertly, and only the isobutene is polymerized.

In a preferred embodiment, the monomer source used for the polymerization is a technical $C_4$ hydrocarbon stream with an isobutene content of 1 to 100% by weight, especially of 1 to 99% by weight, in particular of 1 to 90% by weight, more preferably of 30 to 60% by weight, especially a raffinate 1 stream, a b/b stream from an FCC refinery unit, a product stream from a propylene-isobutane cooxidation or a product stream from a metathesis unit.

Especially when a raffinate 1 stream is used as the isobutene source, the use of water as the sole initiator or as a further initiator has been found to be useful, in particular when polymerization is effected at temperatures of −20° C. to +30° C., especially of 0° C. to +20° C. At temperatures of −20° C. to +30° C., especially of 0° C. to +20° C., when a raffinate 1 stream is used as the isobutene source, it is, however, also possible to dispense with the use of an initiator.

The isobutenic monomer mixture mentioned may comprise small amounts of contaminants such as water, carboxylic acids or mineral acids, without there being any critical yield or selectivity losses. It is appropriate to prevent enrichment of these impurities by removing such harmful substances from the isobutenic monomer mixture, for example by adsorption on solid adsorbents such as activated carbon, molecular sieves or ion exchangers.

It is also possible to convert monomer mixtures of isobutene or of the isobutenic hydrocarbon mixture with olefinically unsaturated monomers copolymerizable with isobutene. When monomer mixtures of isobutene are to be copolymerized with suitable comonomers, the monomer mixture preferably comprises at least 5% by weight, more preferably at least 10% by weight and especially at least 20% by weight of isobutene, and preferably at most 95% by weight, more preferably at most 90% by weight and especially at most 80% by weight of comonomers.

Useful copolymerizable monomers include: vinylaromatics such as styrene and α-methylstyrene, $C_1$—to $C_4$-alkylstyrenes such as 2-, 3- and 4-methylstyrene, and 4-tert-butylstyrene, halostyrenes such as 2-, 3- or 4-chlorostyrene, and isoolefins having 5 to 10 carbon atoms, such as 2-methylbutene-1, 2-methylpentene-1, 2-methylhexene-1, 2-ethylpentene-1, 2-ethylhexene-1 and 2-propylheptene-1. Further useful comonomers include olefins which have a silyl group, such as 1-trimethoxysilylethene, 1-(trimethoxysilyl)propene, 1-(trimethoxysilyl)-2-methylpropene-2, 1-[tri(methoxyethoxy)silyl]ethene, 1-[tri(methoxyethoxy)silyl]propene, and 1-[tri(methoxyethoxy)silyl]-2-methylpropene-2. In addition—depending on the polymerization conditions—useful comonomers also include isoprene, 1-butene and cis- and trans-2-butene.

When the process according to the invention is to be used to prepare copolymers, the process can be configured so as to preferentially form random polymers or to preferentially form block copolymers. To prepare block copolymers, for example, the different monomers can be supplied successively to the polymerization reaction, in which case the second comonomer is especially not added until the first comonomer is already at least partly polymerized. In this manner, diblock, triblock and higher block copolymers are obtainable, which, according to the sequence of monomer addition, have a block of one or the other comonomer as a terminal block. In some cases, however, block copolymers also form when all comonomers are supplied to the polymerization reaction simultaneously, but one of them polymerizes significantly more rapidly than the other(s). This is the case especially when isobutene and a vinylaromatic compound, especially styrene, are copolymerized in the process according to the invention. This preferably forms block copolymers with a terminal polystyrene block. This is attributable to the fact that the vinylaromatic compound, especially styrene, polymerizes significantly more slowly than isobutene.

The polymerization can be effected either continuously or batchwise. Continuous processes can be performed in analogy to known prior art processes for continuous polymerization of isobutene in the presence of boron trifluoride-based catalysts in the liquid phase.

The process according to the invention is suitable either for performance at low temperatures, e.g. at −90° C. to 0° C., or at higher temperatures, i.e. at at least 0° C., e.g. at 0° C. to +30° C. or at 0° C. to +50° C. The polymerization in the process according to the invention is, however, preferably performed at relatively low temperatures, generally at −70° C. to −10° C., especially at −60° C. to −15° C.

When the polymerization in the process according to the invention is effected at or above the boiling temperature of the monomer or monomer mixture to be polymerized, it is preferably performed in pressure vessels, for example in autoclaves or in pressure reactors.

According to the invention the polymerization is carried out as a polymerization in bulk or in solution.

The polymerization in the process according to the invention is preferably performed in the presence of an inert diluent. The inert diluent used should be suitable for reducing the increase in the viscosity of the reaction solution which generally occurs during the polymerization reaction to such an extent that the removal of the heat of reaction which evolves can be ensured. Suitable diluents are those solvents or solvent mixtures which are inert toward the reagents used. Suitable diluents are, for example, aliphatic hydrocarbons such as n-butane, n-pentane, n-hexane, n-heptane, n-octane and isooctane, cycloaliphatic hydrocarbons such as cyclopentane and cyclohexane, aromatic hydrocarbons such as benzene, toluene and the xylenes, and halogenated hydrocarbons, especially halogenated aliphatic hydrocarbons, such as methyl chloride, dichloromethane and trichloromethane (chloroform), 1,1-dichloroethane, 1,2-dichloroethane, trichloroethane and 1-chlorobutane, and also halogenated aromatic hydrocarbons and alkylaromatics halogenated in the alkyl side chains, such as chlorobenzene, monofluoromethylbenzene, difluoromethylbenzene and trifluoromethylbenzene, and mixtures of the aforementioned diluents. The diluents used, or the constituents used in the solvent mixtures mentioned, are also the inert components of isobutenic $C_4$ hydrocarbon streams. A non-halogenated solvent is preferred over the list of halogenated solvents.

The inventive polymerization may be performed in a halogenated hydrocarbon, especially in a halogenated aliphatic hydrocarbon, or in a mixture of halogenated hydrocarbons, especially of halogenated aliphatic hydrocarbons, or in a mixture of at least one halogenated hydrocarbon, especially a halogenated aliphatic hydrocarbon, and at least one aliphatic, cycloaliphatic or aromatic hydrocarbon as an inert diluent, for example a mixture of dichloromethane and n-hexane, typically in a volume ratio of 10:90 to 90:10, especially of 50:50 to 85:15. Prior to use, the diluents are preferably freed of impurities such as water, carboxylic acids or mineral acids, for example by adsorption on solid adsorbents such as activated carbon, molecular sieves or ion exchangers.

In a preferred embodiment, the inventive polymerization is performed in halogen-free aliphatic or especially halogen-free aromatic hydrocarbons, especially toluene. For this embodiment, water in combination with the organic hydroxyl compounds mentioned and/or the organic halogen compounds mentioned, or especially as the sole initiator, have been found to be particularly advantageous.

In another preferred embodiment, the inventive polymerization is performed in halogen-free aliphatic or cycloaliphatic, preferably aliphatic hydrocarbons, especially hexane, pentane, heptane, cyclohexane, cyclopentane, and mixtures comprising them.

The polymerization in the process according to the invention is preferably performed under substantially aprotic and especially under substantially anhydrous reaction conditions. Substantially aprotic and substantially anhydrous reaction conditions are understood to mean that, respectively, the content of protic impurities and the water content in the reaction mixture are less than 50 ppm and especially less than 5 ppm. In general, the feedstocks will therefore be dried before use by physical and/or chemical measures. More particularly, it has been found to be useful to admix the aliphatic or cycloaliphatic hydrocarbons used as solvents, after customary prepurification and predrying with an organometallic compound, for example an organolithium, organomagnesium or organoaluminum compound, in an amount which is sufficient to substantially remove the water traces from the solvent. The solvent thus treated is then preferably condensed directly into the reaction vessel. It is also possible to proceed in a similar manner with the monomers to be polymerized, especially with isobutene or with the isobutenic mixtures. Drying with other customary desiccants such as molecular sieves or predried oxides such as aluminum oxide, silicon dioxide, calcium oxide or barium oxide is also suitable. The halogenated solvents for which drying with metals such as sodium or potassium or with metal alkyls is not an option are freed of water or water traces with desiccants suitable for that purpose, for example with calcium chloride, phosphorus pentoxide or molecular sieves. It is also possible in an analogous manner to dry those feedstocks for which treatment with metal alkyls is likewise not an option, for example vinylaromatic compounds. Even if some or all of the initiator used is water, residual moisture should preferably be very substantially or completely removed from solvents and monomers by drying prior to reaction, in order to be able to use the water initiator in a controlled, specified amount, as a result of which greater process control and reproducibility of the results are obtained.

The polymerization of the isobutene or of the isobutenic starting material generally proceeds spontaneously when the Lewis Acid-donor complex, preferably the aluminum trihalide-donor complex or the alkylaluminum halide complex, especially the alkyl aluminum dichloride-donor complex or dialkyl aluminum chloride-donor complex, is contacted with the isobutene or the isobutenic monomer mixture at the desired reaction temperature. The procedure here may be to initially charge the monomers, optionally in the diluent, to bring it to reaction temperature and then to add the Lewis Acid-donor complex, preferably the aluminum trihalide-donor complex or the alkylaluminum halide complex, especially the alkyl aluminum dichloride-donor complex or dialkyl aluminum chloride-donor complex. The procedure may also be to initially charge the Lewis Acid-donor complex, preferably the aluminum trihalide-donor complex or the alkylaluminum halide complex, especially the alkyl aluminum dichloride-donor complex or dialkyl aluminum chloride-donor complex, optionally in the diluent, and then to add the monomers. In that case, the start of polymerization is considered to be that time at which all reactants are present in the reaction vessel.

To prepare isobutene copolymers, the procedure may be to initially charge the monomers, optionally in the diluent, and then to add the Lewis Acid-donor complex, preferably the aluminum trihalide-donor complex or the alkylaluminum halide complex, especially the alkyl aluminum dichloride-donor complex or dialkyl aluminum chloride-donor complex. The reaction temperature can be established before or after the addition of the Lewis Acid-donor complex, preferably the aluminum trihalide-donor complex or the alkylaluminum halide complex, especially of the alkyl aluminum dichloride-donor complex or dialkyl aluminum chloride-donor complex. The procedure may also be first to initially charge only one of the monomers, optionally in the diluent, then to add the Lewis Acid-donor complex, preferably the aluminum trihalide-donor complex or the alkylaluminum halide complex, especially the alkyl aluminum dichloride-donor complex or dialkyl aluminum chloride-donor complex, and to add the further monomer(s) only after a certain time, for example when at least 60%, at least 80% or at least 90% of the monomer has been converted. Alternatively, the Lewis Acid-donor complex, preferably the aluminum trihalide-donor complex or the alkylaluminum halide complex, especially the alkyl aluminum dichloride-donor complex or dialkyl aluminum chloride-donor complex, can be initially charged, optionally in the diluent, then the monomers can be added simultaneously or successively, and then the desired reaction temperature can be established. In that case, the start of polymerization is considered to be that time at which the Lewis Acid-donor complex, preferably the aluminum trihalide-donor complex or the alkylaluminum halide complex, especially the alkyl aluminum dichloride-donor complex or dialkyl aluminum chloride-donor complex, and at least one of the monomers are present in the reaction vessel.

In addition to the batchwise procedure described here, the polymerization in the process according to the invention can also be configured as a continuous process. In this case, the feedstocks, i.e. the monomer(s) to be polymerized, optionally the diluent and optionally the Lewis Acid-donor complex, preferably the aluminum trihalide-donor complex or the alkylaluminum halide complex, especially the alkyl aluminum dichloride-donor complex or dialkyl aluminum chloride-donor complex, are supplied continuously to the polymerization reaction, and reaction product is withdrawn continuously, such that more or less steady-state polymerization conditions are established in the reactor. The monomer(s) to be polymerized can be supplied as such, diluted with a diluent or solvent, or as a monomer-containing hydrocarbon stream.

The Lewis Acid-donor complex, preferably the aluminum trihalide-donor complex effective as a polymerization catalyst or the alkylaluminum halide complex, especially alkyl aluminum dichloride-donor complex or dialkyl aluminum chloride-donor complex, is generally present in dissolved, dispersed or suspended form in the polymerization medium. Supporting of the Lewis Acid-donor complex, preferably of the aluminum trihalide-donor complex or of the alkylaluminum halide complex, especially of alkyl aluminum dichloride-donor complex or dialkyl aluminum chloride-donor complex, on customary support materials is also possible. Suitable reactor types for the polymerization process of the present invention are typically stirred tank reactors, loop reactors and tubular reactors, but also fluidized bed reactors, stirred tank reactors with or without solvent, fluid bed reactors, continuous fixed bed reactors and batchwise fixed bed reactors (batchwise mode).

In the process according to the invention, the aluminum trihalide-donor complex effective as a polymerization catalyst or the alkylaluminum halide complex, or the iron trihalide-donor complex, or the gallium trihalide-donor complex, or the titanium tetrahalide-donor complex, or the zinc dihalide-donor complex, or the tin dihalide-donor complex, or the tin tetrahalide-donor complex or the boron trihalide-donor complex, especially the alkyl aluminum dichloride-donor complex or dialkyl aluminum chloride-donor complex, is generally used in such an amount that the molar ratio of the metal in the Lewis Acid donor complex, preferably the aluminum in the aluminum trihalide-donor complex or alkylaluminum halide complex, especially in the alkyl aluminum dichloride-donor complex or dialkyl aluminum chloride-donor complex, to isobutene in the case of homopolymerization of isobutene, or to the total amount of the polymerizable monomers used in the case of copolymerization of isobutene, is in the range from 1:5 to 1:5000, preferably from 1:10 to 1:5000, especially 1:15 to 1:1000, in particular 1:20 to 1:250.

In a preferred embodiment of the present invention the reaction conditions are chosen that the conversion of the monomers is at least 80%, preferably at least 85%, and more preferably at least 90%.

It is an advantage of the present invention that the complexes according to the present invention exhibit a high selectivity for polymers with terminal ethylenic double bonds (α-double bonds) and other reactive double bonds, such as β-double bonds, preferably terminal ethylenic double bonds (α-double bonds) even at such high conversion. It is often observed that the selectivity especially to α-double bonds decreases once the conversion of the monomers exceeds the above-mentioned values. It can also be observed that the amount of reactive double bonds, especially α-double bonds formed in the course of the reaction decline at high conversions. It is an advantage of the complexes according to the present invention that the high selectivity is kept at high conversions resp. that the reactive double bonds formed deteriorate to a less extent than for other catalysts.

To stop the reaction, the reaction mixture is preferably deactivated, for example by adding a protic compound, especially by adding water, alcohols such as methanol, ethanol, n-propanol and isopropanol or mixtures thereof with water, or by adding an aqueous base, for example an aqueous solution of an alkali metal or alkaline earth metal hydroxide such as sodium hydroxide, potassium hydroxide, magnesium hydroxide or calcium hydroxide, an alkali metal or alkaline earth metal carbonate such as sodium, potassium, magnesium or calcium carbonate, or an alkali metal or alkaline earth metal hydrogencarbonate such as sodium, potassium, magnesium or calcium hydrogencarbonate.

The process according to the invention serves to prepare high-reactivity isobutene homo- or copolymers with a content of terminal vinylidene double bonds (α-double bonds) and other reactive double bonds, such as β-double bonds per polyisobutene chain end of at least 60, preferably at least 70 and very preferably at least 75 mol %. More particularly, it also serves to prepare high-reactivity isobutene copolymers which are formed from isobutene and at least one vinylaromatic monomer, especially styrene, and have a content of terminal vinylidene double bonds (α-double bonds) and other reactive double bonds, such as β-double bonds per polyisobutene chain end of at least 60, preferably at least 70 mol %, preferably of at least 75 mol %. To prepare such copolymers of isobutene and at least one vinylaromatic monomer, especially styrene, isobutene or an isobutenic hydrocarbon cut is copolymerized with the at least one vinylaromatic monomer in a weight ratio of isobutene to vinylaromatic of 5:95 to 95:5, especially of 30:70 to 70:30.

The high-reactivity isobutene homo- or copolymers prepared by the process according to the invention and specifically the isobutene homopolymers preferably have a polydispersity (PDI=$M_w/M_n$) of 1.05 to less than 3.5, preferably of 1.05 to less than 3.0, preferably of 1.05 to less than 2.5, preferably of 1.05 to 2.3, more preferably of 1.05 to 2.0 and especially of 1.1 to 1.85. Typical PDI values in the case of an optimal process regime are 1.2 to 1.7.

The high-reactivity isobutene homo- or copolymers prepared by the process according to the invention preferably possess a number-average molecular weight $M_n$ (determined by gel permeation chromatography) of preferably of 500 to 100 000, even more preferably of 500 to 25 000 and especially of 500 to 5000. Isobutene homopolymers even more preferably possess a number-average molecular weight $M_n$ of 500 to 10 000 and especially of 500 to 5000, for example of about 1000 or of about 2300.

Some of the isobutene polymers which have terminal vinylidene double bonds and also comprise incorporated initiator molecules and occur as the predominant proportion in the isobutene homopolymers prepared in accordance with the invention are novel compounds. The present invention therefore also provides isobutene polymers of the general formula III (III)

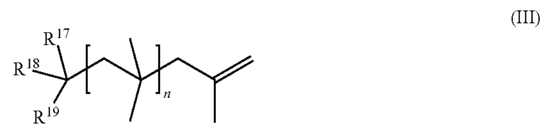

in which $R^{17}$, $R^{18}$ and $R^{19}$ are each independently hydrogen, $C_1$—to $C_{20}$-alkyl, $C_5$—to $C_8$-cycloalkyl, $C_6$—to $C_{20}$-aryl, $C_7$—to $C_{20}$-alkylaryl or phenyl, where any aromatic ring may also bear one or more $C_1$—to $C_4$-alkyl- or $C_1$—to $C_4$-alkoxy radicals or moieties of the general formula IV (IV)

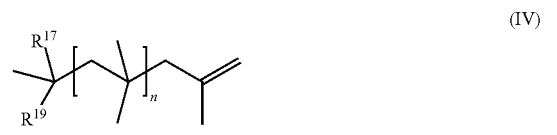

as substituents, where not more than one of the variables $R^{17}$, $R^{18}$ or $R^{19}$ is hydrogen and at least one of the variables $R^{17}$, $R^{18}$ or $R^{19}$ is phenyl which may also bear one or more $C_1$—to $C_4$-alkyl- or $C_1$—to $C_4$-alkoxy radicals or moieties of the general formula II as substituents, and n is a number from 9 to 4500, preferably 9 to 180, especially 9 to 100, in particular 12 to 50.

In a preferred embodiment, $R^{17}$, $R^{18}$ and $R^{19}$ are each independently hydrogen, $C_1$—to $C_4$-alkyl, especially methyl, ethyl, n-propyl, isopropyl, n-butyl, isobutyl, sec.-butyl or tert-butyl, or phenyl which may also bear one or two $C_1$—to $C_4$-alkyl- or $C_1$—to $C_4$-alkoxy radicals or moieties of the general formula II as substituents, where not more than one of the variables $R^{17}$, $R^{18}$ and $R^{19}$ is hydrogen and at least one of the variables $R^{17}$, $R^{18}$ and $R^{19}$ is phenyl which may also bear one or two $C_1$—to $C_4$-alkyl or $C_1$—to $C_4$-alkoxy radicals or moieties of the general formula II as substituents, and n is a number from 9 to 4500, preferably 9 to 180, especially 9 to 90, in particular 15 to 45.

The process according to the invention successfully polymerizes isobutene or isobutene-comprising monomer mixtures under cationic conditions with satisfactory to high conversions of generally 20 to 100%, especially 35 to 90%, in short reaction times of generally 5 to 120 minutes, especially 30 to 120 minutes, to give high-reactivity isobutene homo- or copolymers with a content of α- and β-double bonds per polyisobutene chain end of at least 60, preferably at least 70 and very preferably at least 75 mol %.

It is an advantage of the process according to the present invention that a mixture of at least one organic compound (II), preferably at least one organic compound with at least one ether function and at least one compound of the general formula (I) or (Ia) or (Ib) as donors yield a product with a high content of α- and β-double bonds per polyisobutene chain end compared with the same reaction carried out in the presence of a compound of the general formula (I) or (Ia) or (Ib) as a donor alone under comparable reaction conditions.

It is further an advantage of the present invention that the complex formed from Lewis Acid and compound of formula (I) or (Ia) or (Ib) is liquid and, hence, can be handled easily.

Furthermore, the complex according to the invention can be produced easier than ionic liquids as disclosed in the prior art, since, Lewis Acid and compound of formula (I) or (Ia) or (Ib) just need to be mixed in the ratio desired, whilst the ionic liquid needs to be chemically reacted and purified. It is further possible to adjust the reactivity of the complex formed from Lewis Acid and compound of formula (I) or (Ia) or (Ib) and the at least one organic compound (II) by simply varying their molar ratios in the complex.

The examples which follow are intended to illustrate the present invention in detail without restricting it.

Materials

Isobutylene ("IB", Aldrich, 99.99%) was dried in the gaseous state by passing through the Laboratory Gas Drying Unit. n-Hexane (Sigma-Aldrich, >95%) and $CH_2Cl_2$ (Sigma-Aldrich, >99.5%) were treated with sulphuric acid, washed with aqueous sodium bicarbonate, dried over $CaCl_2$ and distilled twice from $CaH_2$ under an inert atmosphere. $BF_3$ (BASF, >99%) was used in the gaseous state without further purification. Diisopropyl ether ($iPr_2O$, Fluka, >98.5%) was distilled from $CaH_2$ under an inert atmosphere. 2-chloroethyl ethyl ether (CEE, Aldrich, 99%) and bis(2-chloroethyl) ether (CE, Aldrich, >99%) were distilled under reduced pressure from $CaH_2$. Ethyl acetate (EtOAc, Aldrich, 99.8%) was refluxed and distilled over $P_2O_5$ under an inert atmosphere. Tri-n-octylphosphine oxide ($P_{888}O$, Acros Organics, 99%), triphenylphosphine oxide ($PPh_3O$, Acros Organics, 99%) were dried in vacuum during 5 h before use. $AlCl_3$ (Aldrich, 99.999%), $FeCl_3$ (Sigma-Aldrich, >97%), $CDCl_3$ (Euriso-Top®), ethanol (Sigma-Aldrich, >96%), tetrahydrofuran (anhydrous, Sigma-Aldrich, ≥99.9%), were used as received. $TiCl_4$ (Sigma-Aldrich, 99.9%) was distilled over copper chips at 51-52° C. and 40 mmHg.

Instrumentation

Size exclusion chromatography (SEC) was performed on an Ultimate 3000 Thermo Scientific apparatus with Agilent PLgel 5 μm MIXED-C (300×7.5 mm) and one precolumn (PL gel 5 μm guard 50×7.5 mm) thermostated at 30° C. The detection was achieved by differential refractometer (RI) as well as diode array detector (UV). Tetrahydrofuran (THF) was eluted at a flow rate of 1.0 mL/min. The calculation of molecular weight and polydispersity Đ was carried out using polystyrene standards (Polymer Labs, Germany). $^1H$ NMR (500 MHz) spectra were recorded in $CDCl_3$ at 25° C. on a Bruker AC-500 spectrometer calibrated relative to the residual solvent resonance. UV-Vis absorption spectra were recorded using a SM2203 (Solar) spectrofluorimeter.

Catalysts Preparation

Liquid coordination complexes were synthesized by simple mixing of required amounts of dry phosphorus-containing electron donor and corresponding anhydrous Lewis acid under argon atmosphere according to procedure reported in F. Coleman, G. Srinivasan and M. Swadźba-Kwaśny, Angew. Chem., 2013, 52, 12582. Then, the mixture was stirred during 0.5-5 hours at the temperature range between 30° C. and 80° C.

The synthesis of $P_{888}O$—$AlCl_3$ LCC ($\chi(AlCl_3)=0.6$) was performed as following: 0.52 g of $AlCl_3$ was added to the 1 g of $P_{888}O$ under argon atmosphere. Then, the reaction mixture was stirred at 40° C. until it becomes homogeneous (1 hour).

The synthesis of $P_{888}O$—$FeCl_3$ LCC ($\chi(FeCl_3)=0.6$) includes following: 0.63 g of $FeCl_3$ was added to the 1 g of $P_{888}O$ under argon atmosphere. Then, the reaction mixture was stirred at 50° C. until the complete dissolving of phosphine (0.5 hour).

The synthesis of $P_{888}O\times0.67AlCl_3$ donor-acceptor complex was performed as following: 3 mL of dry $CH_2Cl_2$ was added to a mixture of 0.52 g of $AlCl_3$ and 1 g of $P_{888}O$ under argon atmosphere. Then, the reaction mixture was stirred at room temperature until it becomes homogeneous (0.5 h).

The synthesis of $P_{888}O\times0.67FeCl_3$ donor-acceptor complex was performed as following: 3 mL of dry $CH_2Cl_2$ was added to mixture of 0.63 g of $FeCl_3$ and 1 g of $P_{888}O$ under argon atmosphere. Then the reaction mixture was stirred at room temperature until the complete dissolving of $P_{888}$ (0.5 h).

The synthesis of $P_{888}O\times0.58BF_3$ donor-acceptor complex was performed as following: 11.3 mL of dry $CH_2Cl_2$ was added to 4 g of $P_{888}O$ under argon atmosphere. The reaction mixture was purged with gaseous $BF_3$ under inert conditions at −20° C. until the desired ratio of $P_{888}O$ to $BF_3$ was reached.

Polymerization Procedures

The polymerization reactions were carried out in glass tubes equipped with a cold finger condenser under argon atmosphere at temperatures from 0° C. to 20° C. As an example of a typical procedure, polymerization was initiated by adding of isobutylene (2.86 g, $5.1\times10^{-2}$ mol) to a mixture of a total volume 5 mL consisting of 0.11 mL of solution of diisopropyl ether in n-hexane (1 M), 0.11 mL of $P_{888}O$—$FeCl_3$ ($\chi$(FeCl3)=0.6) and n-hexane (4.8 mL). The reaction mixture was stirred during 3-5 min before the monomer addition. After a predetermined time, ca. 2 mL of aqueous ammonia (25%) was poured into the glass reactor to terminate the polymerization. The quenched reaction mixture was diluted by n-hexane, centrifuged to separate the traces of LCC from polymer solution and finally precipitated into cold ethanol. The solvent evaporated under reduced pressure to give the product polymer, which then dried in vacuum (60° C.). Monomer conversions were determined gravimetrically.

The PIB end groups content was determined by $^1H$ NMR spectroscopy (for a typical 1H NMR spectrum see FIG. 1). The signals of protons of exo-olefin end group (b, b') appeared at 4.64 and 4.85 ppm, while endo-olefin end group (d) at 5.15 ppm. The signals of protons of tri- (e) and tetra-substituted (g) olefinic end groups are appeared at 5.15 and 2.84 ppm, whereas the signals of protons of $CH_2$ (l) and $CH_3$ (k) groups belong to chlorine-terminated end group are located at 1.96 and 1.68 ppm, respectively. The small signal at 4.80 ppm correspond to protons of coupled PIB chains (m). The content of exo-olefin end groups was calculated according to the following equation:

$$exo\ (\%)=l[(b+b')/2]/l[k/6+(b+b'+n)/2+d+e+g] \quad \text{(FIG. 1).}$$

In the context of the present invention the term "exo" refers to terminal ethylenic double bonds, vinylidene groups or α-double bonds, as shown in the formula on page 1. These terms are used synonymously throughout the text.

The term "Total vinylidene" means the terminal ethylenic double bonds referred to as exo above and additionally double bonds located internally at the polymer backbone as shown in the following formula:

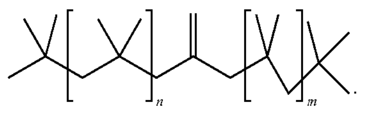

The terms "endo" and "trisubstituted" refer to β-double bonds, as shown in the formulae in FIG. 1 in the second line. These terms are used synonymously throughout the text.

Furthermore "tetrasubstituted" structural elements can be found as shown in the formula in FIG. 1 at the top right. Furthermore, a chlorinated polyisobutene (PIBCI) was found.

EXAMPLES

Example 1: Formation of Liquid Complexes

The following combinations of phosphorus containing electron donors according to formula (II) with Lewis acids were briefly tested in terms of possibility to prepare LCCs:

TABLE 1

| Lewis acid | χ (LA) | $P_{888}O$ | $PPh_3O$ |
|---|---|---|---|
| $AlCl_3$ | 0.6 | yellow liquid | viscous black liquid |
| $FeCl_3$ | 0.6 | dark-brown liquid with the finely dispersed precipitate | black solid |
| $TiCl_4$ | 0.6 | viscous bright yellow liquid | orange solid |

The liquid complexes listed in Table 1 were further investigated in the polymerization of isobutene.

Example 2

According to the general procedure outlined above isobutylene was polymerized in the presence of $PPh_3O$—$AlCl_3$ as catalyst in n-hexane. Further to the conditions mentioned in Table 2 the polymerization was carried out as follows:

Mole fraction $\chi(AlCl_3)$=0.6; [IB]=5.2 M; T=0° C.; reaction time=30 min.

| | [LCC] | Ether | conv. | $M_n$ | | End group distribution (%) | | | | |
|---|---|---|---|---|---|---|---|---|---|---|
| run | mM | (mM) | (%) | (g $mol^{-1}$) | Đ | exo | endo + tri | tetra | PIBCI | coupled |
| 1[b] | 22 | — | 81 | 1300 | 7.7 | 5 | 6 | 28 | 0 | 0 |
| 2 | 22 | $^iPr_2O$ (11) | 32 | 2300 | 5.1 | 11 | 55 | 34 | 0 | 0 |
| 3 | 33 | $^iPr_2O$ (11) | 89 | 1000 | 5.1 | 5 | 66 | 29 | 5 | 0 |
| 4 | 33 | $^iPr_2O$ (22) | 30 | 4900 | 3.2 | 36 | 35 | 27 | 2 | 0 |
| 5 | 33 | CE (22) | 100 | 5000 | 3.3 | 57 | 24 | 18 | 1 | 0 |
| 6 | 33 | CEE (22) | 95 | 1400 | 2.1 | 70 | 15 | 9 | 0 | 6 |

[b]time = 10 min.

Example 3

According to the general procedure outlined above isobutylene was polymerized in the presence of $P_{888}O$—$AlCl_3$ as catalyst in n-hexane. Further to the conditions mentioned in Table 3 the polymerization was carried out as follows:

| | | | conv. | $M_n$ | | End group distribution (%) | | | | |
|---|---|---|---|---|---|---|---|---|---|---|
| run | ether | T, ° C. | (%) | (g $mol^{-1}$) | Đ | exo | endo + tri | tetra | PIBCI | coupled |
| 1[b] | — | 0 | 72 | 5200 | 4.0 | 0 | 68 | 32 | 0 | 0 |
| 2[b] | $^iPr_2O$ | 0 | 15 | 3600 | 2.7 | 71 | 1 | 1 | 27 | 0 |
| 3 | $^iPr_2O$ | 0 | 37 | 6500 | 3.1 | 48 | 25 | 13 | 14 | 0 |
| 4 | $^iPr_2O$ | 10 | 44 | 6000 | 3.2 | 23 | 42 | 19 | 16 | 0 |
| 5 | $^iPr_2O$ | 20 | 84 | 3600 | 2.3 | 2 | 69 | 30 | 0 | 0 |
| 6 | CEE | 0 | 40 | 5000 | 3.9 | 67 | 1 | 1 | 27 | 0 |
| 7 | CEE | 10 | 46 | 4200 | 2.9 | 67 | 25 | 13 | 14 | 0 |
| 8 | CEE | 20 | 56 | 2000 | 3.5 | 65 | 23 | 11 | 1 | 0 |
| 9 | CE | 0 | 100 | 6900 | 2.2 | 81 | 0 | 0 | 19 | 0 |

[b][$P_{888}O$—$AlCl_3$] = 22 mM.

Example 4

According to the general procedure outlined above isobutylene was polymerized in the presence of $P_{888}O$—$FeCl_3$ as catalyst in n-hexane at 0° C. Further to the conditions mentioned in Table 4 the polymerization was carried out as follows:

Mole fraction $\chi(FeCl_3)$=0.6; [$P_{888}O$—$FeCl_3$]=22 mM; [IB]=5.2 M

| run | [$R_2O$] | [$R_2O$] [LCC] | Time (min) | conv. (%) | $M_n$ (g $mol^{-1}$) | Đ | End group distribution (%) exo | endo + tri | tetra | PIBCl | coupled |
|---|---|---|---|---|---|---|---|---|---|---|---|
| 1 | — | — | 20 | 90 | 1800 | 7.0 | 25 | 35 | 36 | 0 | 4 |
| 2 | $^iPr_2O$ | 1 | 20 | 26 | 2100 | 2.8 | 91 | 3 | 3 | 3 | 0 |
| 3 | $^iPr_2O$ | 0.66 | 20 | 52 | 1400 | 2.3 | 97 | 2 | 0 | 0 | 1 |
| 4 | $^iPr_2O$ | 0.5 | 20 | 100 | 1500 | 2.1 | 91 | 3 | 1 | 0 | 5 |
| 5 | CEE | 0.5 | 15 | 100 | 1000 | 2.2 | 80 | 10 | 4 | 0 | 6 |
| 6 | CE | 0.5 | 10 | 100 | 1300 | 3.1 | 41 | 29 | 24 | 0 | 6 |

Example 5

To have a deeper insight into the polymerization mechanism, the kinetics of isobutylene polymerization with the $P_{888}O$—$FeCl_3$/$^iPr_2O$ initiating system at [$^iPr_2O$]/[$P_{888}O$—$FeCl_3$]=0.5 was briefly investigated.

Figure 3:
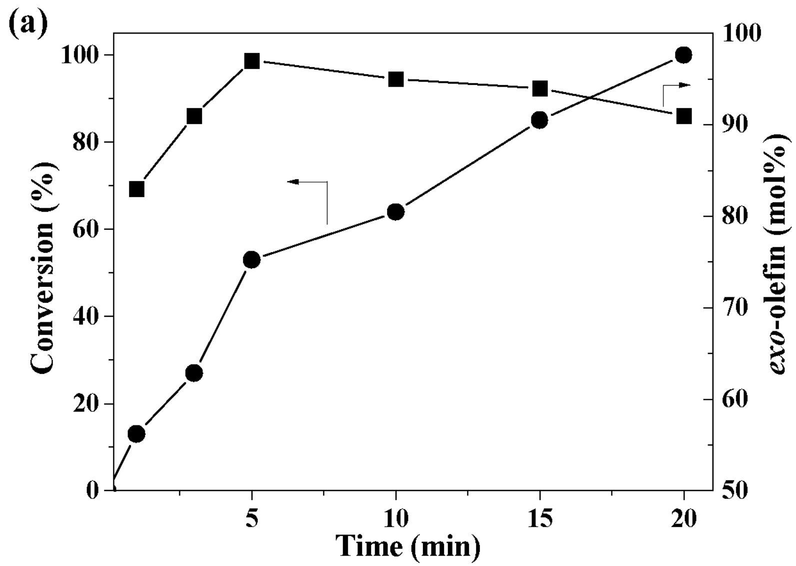
FIG. 3 shows a graph of the kinetics of isobutylene polymerization with the $P_{888}O$—$FeCl_3$/$^iPr_2O$ initiating system at $[^iPr_2O]/[P_{888}O—FeCl_3]=0.5$.

The result was shown in FIG. 3.

Figure 2:
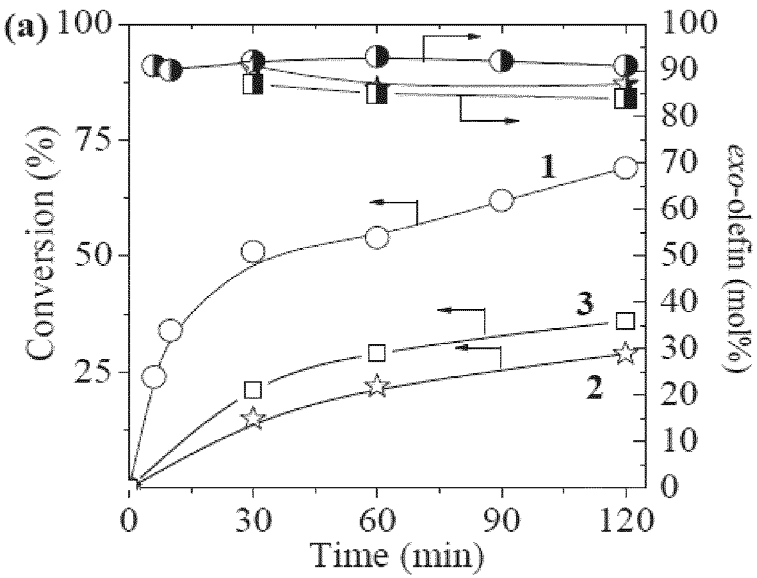
FIG. 2 shows a graph of the kinetics of isobutylene polymerization with [emim]Cl—$FeCl_3$.

It can easily be seen that the reaction according to the invention yields much higher conversion rates than the reaction with [emim]Cl—$FeCl_3$ (2) according to Polymer, 145 (2018) 382-390, shown in FIG. 2.

The complex $P_{888}O$—$FeCl_3$/$^iPr_2O$ does not only leads to higher conversion of isobutene in shorter time than the system [emim]Cl—$FeCl_3$.

Simultaneously, the exo-selectivity at a certain conversion is higher for the complexes according to the invention than for those used for the reaction according to FIG. 2.

Example 6

The polymerization reaction was carried out in steel vessel equipped with a cold finger condenser under inert atmosphere at −20° C. Polymerization was initiated by adding of isobutylene (25.20 g, $45.0\times10^{-2}$ mol) to a mixture of a total volume 150.02 mL consisting of 0.02 mL of MeOH, 10.00 mL of $P_{888}O$—$BF_3$ ($\chi(BF_3)$=0.58) and n-hexane (140.00 mL). After 1 h, 5 mL of MeOH was poured into the steel vessel to terminate the polymerization. The quenched reaction mixture was diluted by n-hexane and washed 3 times with MeOH. The solvent was evaporated under reduced pressure at 190° C. to give the product polymer. Monomer conversion was determined gravimetrically.

| run | conv. (%) | $M_n$ (g $mol^{-1}$) | Đ | End group distribution (%) exo | endo + tri | tetra | coupled |
|---|---|---|---|---|---|---|---|
| 1 | 86 | 920 | 1.2 | 35 | 60 | 4 | 1 |

The invention claimed is:

1. A bulk- or solution polymerisation process for preparing a high-reactivity isobutene homo- or copolymer with a combined content of α-double bonds and β-double bonds per polyisobutene chain end of at least 60 mol %, the process comprising:

polymerizing isobutene or an isobutene-comprising monomer mixture in the presence of a polymerization catalyst formed with at least one Lewis Acid and a donor, to obtain the high-reactivity isobutene homo- or copolymer, wherein the polymerization catalyst is selected from the group consisting of an aluminum trihalide-donor complex, an alkylaluminum halide-donor complex, an iron trihalide-donor complex, a gallium trihalide-donor complex, a titanium tetrahalide-donor complex, a zinc dihalide-donor complex, a tin dihalide-donor complex, a tin tetrahalide-donor complex, and a boron trihalide-donor complex, wherein the donor of said polymerization catalyst comprises a mixture of at least one organic compound (II) comprising at least one dihydrocarbyl ether of the general formula $R^8$—O—$R^9$, wherein $R^8$ and $R^9$ are each independently a $C_1$- to $C_{20}$-alkyl radical, a $C_1$- to $C_{20}$-haloalkyl radical, a $C_5$- to $C_8$-cycloalkyl radical, a $C_6$- to $C_{20}$-aryl radical, a $C_6$- to $C_{20}$-haloaryl radical, or a $C_7$- to $C_{20}$-arylalkyl radical, and at least one phosphorus-containing compound of formula (I)

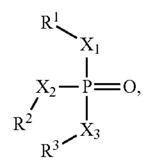

or $P(OR^1)(OR^2)(OR^3)$,or formula (Ia)

$P(OR^1)(OR^2)(OR^3)(OR^4)(OR^5)$, formula (Ib)

wherein $X_1$, $X_2$, and $X_3$ independently of another are oxygen, sulphur, or a single bond, and $R^1$, $R^2$, $R^3$, $R^4$, and $R^5$ independently of another are an organic residue with up to 20 carbon atoms, with the proviso that a complex formed from the at least one Lewis Acid and the at least one phosphorus-containing compound of formula (I), formula (Ia), or formula (Ib) has a melting point of not more than 60° C., said at least one organic compound (II) and said at least one phosphorus-containing compound of formula (I), formula (Ia), or formula (Ib) are present in a molar ratio of 0.1:1 to 1:0.1, and said high-reactivity isobutene homo- or copolymer has a number-average molecular weight Mn, determined by gel permeation chromatography of 500 to 5,000 g/mol.

2. The process according to claim 1, wherein the at least one organic compound (II) comprises at least one oxygen atom with at least one lone electron pair.

3. The process according to claim 1, wherein the at least one organic compound (II) is selected from the group consisting of organic compounds with at least one ether function, organic compounds with at least one carboxylic ester function, organic compounds with at least one aldehyde function, and organic compounds with at least one keto function.

4. The process according to claim 1, wherein the at least one organic compound (II) is at least one organic compound with at least one ether function, and is selected from the group consisting of diethyl ether, di-n-butyl ether, di-isopropyl ether, di-n-propyl ether, bis(2-chloroethyl) ether, and 2-chloroethyl ethyl ether.

5. The process according to claim 1, wherein $X_1$, $X_2$, and $X_3$ each are a single bond.

6. The process according to claim 1, wherein $R^1$ to $R^5$ each are $C_2$-$C_{18}$-alkyl or $C_6$-$C_{12}$-aryl.

7. The process according to claim 1, wherein the at least one phosphorus-containing compound is at least one selected from the group consisting of tri-n-hexylphosphine oxide, tri-n-octylphosphine oxide, tri iso-nonyl phosphine oxide, tri-n-decylphosphine oxide, tri-n-dodecylphosphine oxide, tri iso-tridecyl phosphine oxide, tri-n-tetradecylphosphine oxide, tri iso-heptadecyl phosphine oxide, triphenylphosphine oxide, tritolylphosphine oxide, trinaphtylphosphine oxide, phosphorous acid tri (n-butyl) ester, phosphorous acid tri (n-hexyl) ester, phosphorous acid tri (2-ethylhexyl) ester, phosphorous acid tri (n-octyl) ester, phosphorous acid tri (2-propylheptyl) ester, phosphorous acid tri (n-decyl) ester, phosphorous acid tri (n-dodecyl) ester, phosphorous acid tri (n-tetradecyl) ester, phosphorous acid tri (n-hexadecyl) ester, tri-ethylphosphite, tri-n-butylphosphite, tri-n-hexylphosphite, tri-n-octylphosphite, tri iso-nonyl phosphite, tri-n-decylphosphite, tri-n-dodecylphosphite, tri iso-tridecyl phosphite, tri-n-tetradecylphosphite, tri iso-heptadecyl phosphite, triphenylphosphite, penta (ethoxy) phosphorane, penta (n-butyloxy) phosphorane, penta (hexyloxy) phosphorane, penta (n-octyloxy) phosphorane, penta (2-ethylhexyloxy) phosphorane, and penta (phenoxy) phosphorane.

8. The process according to claim 1, wherein the polymerization catalyst is the aluminum trihalide-donor complex, the alkylaluminum halide-donor complex, or the iron trihalide-donor complex.

9. The process according to claim 1, wherein the polymerization catalyst is the iron-trihalide donor complex.

10. The process according to claim 1, wherein a molar ratio of the at least one Lewis Acid to the compound of formula (I) is from 1:0.1 to 10.

11. The process according to claim 1, wherein a molar ratio of aluminum trihalide or alkylaluminum halide to isobutene monomer in the case of homopolymerization of isobutene, or to a total amount of polymerizable monomers in the case of copolymerization of isobutene, based on each individual functional site of the aluminum trihalide or the alkylaluminum halide, is from 0.001:1 to 0.2:1.

12. The process according to claim 1, wherein the polymerization is performed with a mono- or polyfunctional initiator which is at least one selected from the group consisting of an organic hydroxyl compound in which one or more hydroxyl groups are each bonded to an $sp^3$-hybridized carbon atom, an organic halogen compound in which one or more halogen atoms are each bonded to an $sp^3$-hybridized carbon atom, and water.

13. The process according to claim 12, wherein the initiator is at least one selected from the group consisting of water, methanol, ethanol, 1-phenylethanol, 1-(p-methoxyphenyl) ethanol, n-propanol, isopropanol, 2-phenyl-2-propanol, n-butanol, isobutanol, secbutanol, tert-butanol, 1-phenyl-1-chloroethane, 2-phenyl-2-chloropropane, tert-butyl chloride, and 1,3- or 1,4-bis(1-hydroxy-1-methylethyl) benzene.

14. The process according to claim 12, wherein a molar ratio of the initiator to isobutene monomer in the case of homopolymerization of isobutene, or to a total amount of polymerizable monomers in the case of copolymerization of isobutene, based on each individual functional site of the initiator, is from 0.0005:1 to 0.1:1, or wherein when the initiator is water or water in combination with the organic hydroxyl compound and/or the organic halogen compound, a molar ratio of water to the isobutene monomer in the case of homopolymerization of isobutene, or to the total amount of the polymerizable monomers in the case of copolymerization of isobutene, is from 0.0001:1 to 0.1:1.

15. The process according to claim 1, wherein the polymerization is performed at a temperature of −90° C. to +30° C.

* * * * *